(12) United States Patent
Zhang et al.

(10) Patent No.: US 12,034,916 B2
(45) Date of Patent: Jul. 9, 2024

(54) NEURAL NETWORK-BASED VIDEO COMPRESSION WITH SPATIAL-TEMPORAL ADAPTATION

(71) Applicant: Lemon Inc., Grand Cayman (KY)

(72) Inventors: Zhaobin Zhang, San Diego, CA (US); Li Zhang, San Diego, CA (US); Yue Li, San Diego, CA (US); Kai Zhang, San Diego, CA (US)

(73) Assignee: Lemon Inc.

( * ) Notice: Subject to any disclaimer, the term of this patent is extended or adjusted under 35 U.S.C. 154(b) by 59 days.

(21) Appl. No.: 17/829,892

(22) Filed: Jun. 1, 2022

(65) Prior Publication Data

US 2022/0394240 A1 Dec. 8, 2022

Related U.S. Application Data

(60) Provisional application No. 63/196,332, filed on Jun. 3, 2021.

(51) Int. Cl.
*H04N 19/105* (2014.01)
*H04N 19/107* (2014.01)
*H04N 19/137* (2014.01)
*H04N 19/176* (2014.01)

(52) U.S. Cl.
CPC ......... *H04N 19/105* (2014.11); *H04N 19/107* (2014.11); *H04N 19/137* (2014.11); *H04N 19/176* (2014.11)

(58) Field of Classification Search
None
See application file for complete search history.

(56) References Cited

U.S. PATENT DOCUMENTS

2020/0053388 A1\* 2/2020 Schroers .............. H04N 19/537

OTHER PUBLICATIONS

Cheng, Z., et al., "Learned image compression with discretized gaussian mixture likelihoods and attention modules," in Proceedings of the IEEE/CVF Conference on Computer Vision and Pattern Recognition, Mar. 30, 2020, pp. 7939-7948.
Document: JVET-S2001-vH, Bross, B., et al., "Versatile Video Draft (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
Dony, R.D. et al., "Neural network approaches to image compression," Proceedings of the IEEE, vol. 83, No. 2, 1995, pp. 288-303.
Wang, Z., et al., "Image quality assessment: From error visibility to structural similarity," IEEE Transactions on Image Processing, vol. 13, No. 4, Apr. 2004, pp. 600-612.

(Continued)

*Primary Examiner* — Christopher G Findley
(74) *Attorney, Agent, or Firm* — Conley Rose, P.C.

(57) ABSTRACT

A mechanism for processing video data is disclosed. A determination is made to apply an end-to-end neural network-based video codec to a current video unit of a video. The end-to-end neural network-based video codec comprises a spatial-temporal adaptive compression (STAC) component including a frame extrapolative compression (FEC) branch and an image compression branch. A conversion is performed between the current video unit and a bitstream of the video via the end-to-end neural network-based video codec.

19 Claims, 11 Drawing Sheets

(56) References Cited

OTHER PUBLICATIONS

Document: VCEG-M33, Bjontegaard, G., "Calculation of average PSNR differences between RD-curves," ITU—Telecommunications Standardization Sector Study Group 16 Question 6, Video Coding Experts Group (VCEG), Thirteenth Meeting: Austin, Texas, USA, Apr. 2-4, 2001, 4 pages.
Shannon, et al., "The mathematical theory of communication," Bell System Technical Journal, vol. 27, No. 3, 1948, pp. 379-423.
Larochelle, H., et al., "The neural autoregressive distribution estimator," in Proceedings of the Fourteenth International Conference on Artificial Intelligence and Statistics, 2011, pp. 29-37.
Gregor, K., et al., "Learning representations by maximizing compression," arXiv preprint arXiv: 1108.1169v1, Aug. 4, 2011, 8 pages.
Uria, B., et al., "RNADE: The real-valued neural autoregressive density-estimator," in NIPS, 2013, pp. 2175-2183.
Theis, L., et al., "Generative image modeling using spatial LSTMs," in NIPS, 2015, pp. 1927-1935.
Uria, B., et al., "A deep and tractable density estimator," in ICML, 2014, pp. 467-475.
Witten, I.H. et al., "Arithmetic coding for data compression," Communications of the ACM, vol. 30, No. 6, 1987, pp. 520-541.
Oord, A., et al., "Pixel recurrent neural networks," in ICML, 2016, pp. 1747-1756.
Oord, A., et al., "Conditional image generation with PixelCNN decoders," in NIPS, 2016, pp. 4790-4798.
Salimans, T., et al., "PixelCNN++: Improving the PixelCNN with discretized logistic mixture likelihood and other modifications," arXiv preprint arXiv:1701.05517, Jan. 19, 2017, 10 pages.
Chen X., et al., "PixelSNAIL: An improved autoregressive generative model," in ICML, 2018, pp. 863-871.
Hinton, G.E., et al., "Reducing the dimensionality of data with neural networks," Science, vol. 313, No. 5786, 2006, pp. 504-507.
Toderici, G., et al., "Variable rate image compression with recurrent neural networks," arXiv preprint arXiv:1511.06085, Mar. 1, 2016, 12 pages.
Toderici, G., et al., "Full resolution image compression with recurrent neural networks," in CVPR, arXiv:1608.05148v2, Jul. 7, 2017, pp. 5306-5314.
Johnston, N., et al., "Improved lossy image compression with priming and spatially adaptive bit rates for recurrent networks," in CVPR, arXiv:1703.10114v1, Mar. 29, 2017, pp. 4385-4393.
Covell, M., et al., "Target-quality image compression with recurrent, convolutional neural networks," arXiv preprint arXiv:1705.06687, May 18, 2017, 5 pages.
Balle, J., et al., "End-to-end optimization of nonlinear transform codes for perceptual quality," in PCS, IEEE, arXiv:1607.05006v2, Oct. 17, 2016, pp. 1-5.
Balle, J., "Efficient nonlinear transforms for lossy image compression," in PCS, arXiv:1802.00847v2, Jul. 31, 2018, pp. 248-252.
Balle, J., et al., "End-to-end optimized image compression," in International Conference on Learning Representations, arXiv:1611.01704v3, Mar. 3, 2017, 27 pages.
Balle, J., et al., "Variational image compression with a scale hyperprior," in International Conference on Learning Representations, arXiv:1802.01436v2, May 1, 2018, 23 pages.
Minnen, D., et al., "Joint Autoregressive and Hierarchical Priors for Learned Image Compression", arXiv.1809.02736, Sep. 8, 2018, 22 pages.
Github repository "CompressAI: https://github.com/InterDigitalInc/CompressAI,"InterDigital Inc, accessed Dec. 2020, 6 pages.
Chen, T., et al., "DeepCoder: A deep neural network based video compression," in VCIP, IEEE, 2017, pp. 1-4.

Wu, C-Y., et al., "Video compression through image interpolation," in Proceedings of the European Conference on Computer Vision (ECCV), arXiv:1804.06919v1, Apr. 18, 2018, pp. 416-431.
Chen, Z., et al., "Learning for video compression," IEEE Transactions on Circuits and Systems for Video Technology, DOI: 10.1109/TCSVT.2019.2892608, arXiv:1804.09869v2, Jan. 9, 2019, 11 pages.
Lu, G., et al., "DVC: An end-to-end deep video compression framework," in Pr ceedings of the IEEE/CVF Conference on Computer Vision and Pattern Recognition (CVPR), 2019, 10 pages.
Rippel, O., et al., "Learned Video Compression," 2019 IEEE/CVF International Conference on Computer Vision (ICCV), Seoul, Korea (South), doi: 10.1109/ICCV.2019.00355, arXiv:1811.06981v1, Nov. 16, 2018, 2019, pp. 3453-3462.
Habibian, A., et al., "Video Compression with Rate-Distortion Autoencoders," in Proceedings of the IEEE/CVF International Conference on Computer Vision (ICCV), 2019, pp. 7033-7042.
Lin, J., et al., "M-LVC: Multiple frames prediction for learned video compression," in Proceedings of the IEEE/CVF Conference on Computer Vision and Pattern Recognition (CVPR), arXiv:2004.10290v1, Apr. 21, 2020, 14 pages.
Augustsson, E., et al., "Scale-Space Flow for End-to-End Optimized Video Compression," 2020 IEEE/CVF Conference on Computer Vision and Pattern Recognition (CVPR), Seattle, WA, USA, doi: 10.1109/CVPR42600.2020.00853, 2020, pp. 8500-8509.
Hu, Z., et al., "Improving deep video compression by resolution-adaptive flow coding," in European Conference on Computer Vision (ECCV), arXiv:2009.05982v1, Sep. 13, 2020, 20 pages.
Li, B., et al., "Domain Rate Control Algorithm for High Efficiency Video Coding," in IEEE Transactions on Image Processing, vol. 23, No. 9, doi: 10.1109/TIP.2014.2336550, Sep. 2014, pp. 3841-3854.
Li, L., et al., "$\lambda$ Domain Optimal Bit Allocation Algorithm for High Efficiency Video Coding," in IEEE Transactions on Circuits and Systems for Video Technology, vol. 28, No. 1, doi: 10.1109/TCSVT.2016.2598672, Jan. 2018, pp. 130-142.
Djelouah, A., et al., "Neural inter-frame com-pression for video coding," In ICCV, Oct. 2019, pp. 6421-6429.
Document: JCTVC-J1100, Bossen, et al., "Common Test Conditions and Software Reference Configurations," Stockholm, Sweden, WG11 No. m26383, Jul. 11-20, 2012, 3 pages.
Kamaci, N., et al., "Frame bit allocation for the h.264/avc video coder via cauchy-density-based rate and distortion models," IEEE Transactions on Circuits and Systems for Video Technology, vol. 15, No. 8, Aug. 2005, pp. 994-1006.
Mallat. S., et al., "Analysis of low bit rate image transform coding," IEEE Transactions on Signal Processing, vol. 46, No. 4, Apr. 1998, pp. 1027-1042.
Sullivan, G.J., et al., "Overview of the High Efficiency Video Coding (HEVC) Standard," in IEEE Transactions on Circuits and Systems for Video Technology, vol. 22, No. 12, doi: 10.1109/TCSVT.2012.2221191., Dec. 2012, pp. 1649-1668.
Cheng, Z., et al., "Learning image and video compression through spatial-temporal energy compaction," In 2019 IEEE/CVF Conference on Computer Vision and Pattern Recognition (CVPR), 2019, pp. 10071-10080.
"Ultra video group test sequences," Retrieved from the internet: http://ultravideo.cs.tut.fi, Aug. 30, 2022, 6 pages.
Sun, D., et al., "PWC-Net: CNNs for Optical Flow Using Pyramid, Warping, and Cost Volume," 2018 IEEE/CVF Conference on Computer Vision and Pattern Recognition, doi: 10.1109/CVPR.2018.00931, Jun. 25, 2018, pp. 8934-8943.
Niklaus, S., et al., "Video frame interpolation via adaptive separable convolution," In IEEE International Conference on Computer Vision, arXiv:1708.01692v1, Aug. 5, 2017, 10 pages.
Djelouah, A., et al., "Neural inter-frame compression for video coding," In Proceedings of the IEEE/CVF International Conference on Computer Vision (ICCV), Oct. 2019, 9 pages.

* cited by examiner

NEURAL NETWORK-BASED VIDEO COMPRESSION WITH SPATIAL-TEMPORAL ADAPTATION

CROSS-REFERENCE TO RELATED APPLICATIONS

This patent application claims the benefit of U.S. Provisional Patent Application No. 63/196,332 filed Jun. 3, 2021 by Zhaobin Zhang et. al., and titled "Neural Network-Based Video Compression With Spatial-Temporal Adaptation," which is hereby incorporated by reference.

TECHNICAL FIELD

This patent document relates to processing of digital video.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining to apply an end-to-end neural network-based video codec to a current video unit of a video, wherein the end-to-end neural network-based video codec comprises a spatial-temporal adaptive compression (STAC) component including a frame extrapolative compression (FEC) branch and an image compression branch; and performing a conversion between the current video unit and a bitstream of the video via the end-to-end neural network-based video codec.

Optionally, in any of the preceding aspects, another implementation of the aspect provides that the current video unit is assigned for conversion by one of the FEC branch and the image compression branch based on motion information of the current video unit, entropy of the current video unit, or combinations thereof.

Optionally, in any of the preceding aspects, another implementation of the aspect provides that the FEC branch employs a plurality of coded frames as reference frames to predict the current video unit, and wherein an indication of motion information between the reference frames and the current video unit is included in the bitstream.

Optionally, in any of the preceding aspects, another implementation of the aspect provides that the FEC branch employs a plurality of coded frames as reference frames to predict the current video unit, and wherein motion information between the reference frames and the current video unit is not included in the bitstream.

Optionally, in any of the preceding aspects, another implementation of the aspect provides that the end-to-end neural network-based video codec further comprises a bilateral predictive learned compression (BPLC) component, wherein the STAC component performs the conversion on the current video unit when the current video unit is a key frame, and wherein the BPLC component performs the conversion on the current video unit when the current video unit is not a key frame.

Optionally, in any of the preceding aspects, another implementation of the aspect provides that the BPLC component interpolates the current video unit based on at least one preceding reference frame and at least one succeeding reference frame.

Optionally, in any of the preceding aspects, another implementation of the aspect provides that the current video unit is predicted based on a preceding reconstructed key frame, a succeeding reconstructed key frame, motion information, multiple reference frames, or combinations thereof.

Optionally, in any of the preceding aspects, another implementation of the aspect provides that the end-to-end neural network-based video codec selects one of a plurality of inter-predictive compression networks for application to the current video unit.

Optionally, in any of the preceding aspects, another implementation of the aspect provides that the plurality of inter-predictive compression networks includes a flow-based network that codes the current video unit by deriving an optical flow.

Optionally, in any of the preceding aspects, another implementation of the aspect provides that the plurality of inter-predictive compression networks includes a kernel-based network that codes the current video unit by deriving a predicted frame by convolving a learned kernel with one or more reference frames.

Optionally, in any of the preceding aspects, another implementation of the aspect provides that the selection of the one of the plurality of inter-predictive compression networks is included in the bitstream.

Optionally, in any of the preceding aspects, another implementation of the aspect provides that the end-to-end neural network-based video codec selects one of a plurality of intra-predictive compression networks for application to the current video unit.

Optionally, in any of the preceding aspects, another implementation of the aspect provides that the end-to-end neural network-based video codec codes the current video unit with a combination of block predictions and frame predictions.

Optionally, in any of the preceding aspects, another implementation of the aspect provides that the end-to-end neural network-based video codec selects one of a plurality of motion compression networks for application to the current video unit.

Optionally, in any of the preceding aspects, another implementation of the aspect provides that the conversion includes encoding the current video unit into the bitstream.

Optionally, in any of the preceding aspects, another implementation of the aspect provides that the conversion includes decoding the current video unit from the bitstream.

A second aspect relates to apparatus for processing video data comprising: a processor; and a non-transitory memory with instructions thereon, wherein the instructions upon execution by the processor, cause the processor to: determine to apply an end-to-end neural network-based video codec to a current video unit of a video, wherein the end-to-end neural network-based video codec comprises a spatial-temporal adaptive compression (STAC) component including a frame extrapolative compression (FEC) branch and an image compression branch; and perform a conversion between the current video unit and a bitstream of the video via the end-to-end neural network-based video codec.

Optionally, in any of the preceding aspects, another implementation of the aspect provides that the current video unit is assigned for conversion by one of the FEC branch and the image compression branch based on motion information of the current video unit, entropy of the current video unit, or combinations thereof.

Optionally, in any of the preceding aspects, another implementation of the aspect provides that the end-to-end neural network-based video codec further comprises a bilateral predictive learned compression (BPLC) component, wherein the STAC component performs the conversion on the current video unit when the current video unit is a key frame, and wherein the BPLC component performs the conversion on the current video unit when the current video unit is not a key frame.

A third aspect relates to a non-transitory computer readable medium storing a bitstream of a video which is generated by a method performed by a video processing apparatus, wherein the method comprises: determining to apply an end-to-end neural network-based video codec to a current video unit of the video, wherein the end-to-end neural network-based video codec comprises a spatial-temporal adaptive compression (STAC) component including a frame extrapolative compression (FEC) branch and an image compression branch; and generating the bitstream via the end-to-end neural network-based video codec.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
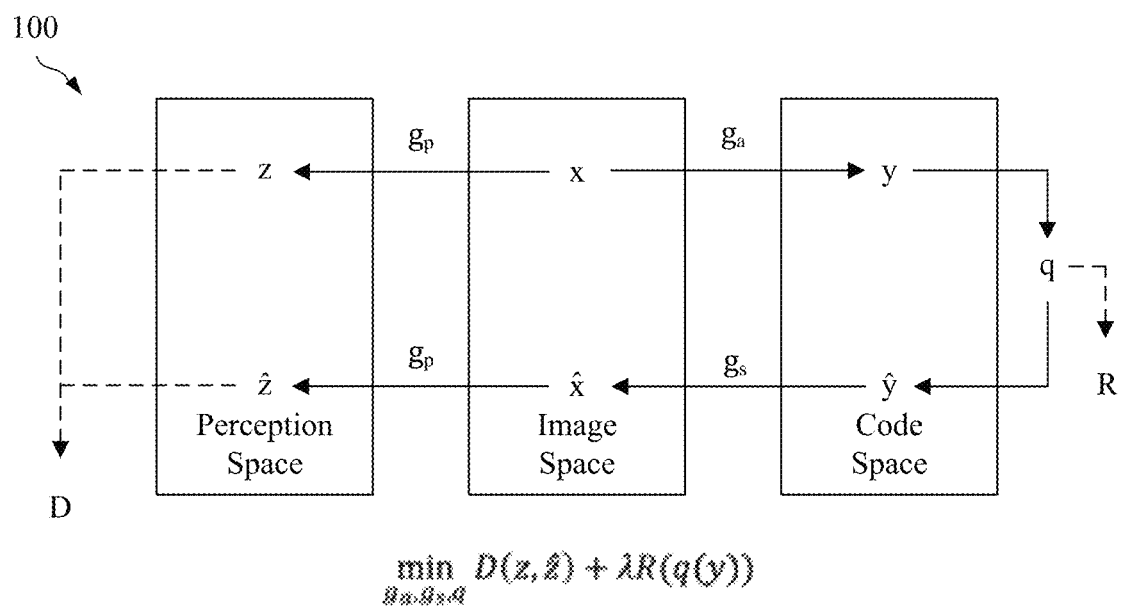
FIG. 1 is a schematic diagram illustrating an example transform coding scheme.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

This patent document is related to a video compression using neural networks, and more particularly, to spatial-temporal adaptive compression for neural network-based (NN-based) video compression for random-access scenarios. The disclosed mechanisms may also be applicable to a hybrid compression framework, where neural network-based coding tools are integrated into the framework of a video coding standards, such as high efficiency video coding (HEVC), versatile video coding (VVC), etc.

The described techniques relate to improved algorithms and methods for optimizing rate-distortion (R-D) performance. Generally, the described techniques support temporal adaptive compression in a neural network-based video coding framework, for example, by offering inter-predictive compression and/or intra-predictive compression modes for key frames and/or providing a content-adaptive compression mode selection mechanism. For example, the spatial-temporal adaptive compression can remove temporal correlations in key frames, which may lead to a better R-D performance. In addition, spatial-temporal adaptive compression can also be performed in basic unit (BU) level. For example, the key frames can select a more optimal compression scheme between an inter-predictive scheme and an intra-predictive scheme at the block-level.

Deep learning is developing in a variety of areas, such as in computer vision and image processing. Inspired by the successful application of deep learning technology to computer vision areas, neural image/video compression technologies are being studied for application to image/video compression techniques. The neural network is designed based on interdisciplinary research of neuroscience and mathematics. The neural network has shown strong capabilities in the context of non-linear transform and classification. An example neural network-based image compression algorithm achieves comparable R-D performance with Versatile Video Coding (VVC), which is a video coding standard developed by the Joint Video Experts Team (JVET) with experts from motion picture experts group (MPEG) and Video coding experts group (VCEG). Neural network-based video compression is an actively developing research area resulting in continuous improvement of the performance of neural image compression. However, neural network-based video coding is still a largely undeveloped discipline due to the inherent difficulty of the problems addressed by neural networks.

Image and/or video compression is now discussed. Image/video compression usually refers to a computing technology that compresses video images into binary code to facilitate storage and transmission. The binary codes may or may not support losslessly reconstructing the original image/video. Coding without data loss is known as lossless compression and coding while allowing for targeted loss of data in known as lossy compression, respectively. Most coding systems employ lossy compression since lossless reconstruction is not necessary in most scenarios. Usually the performance of image/video compression algorithms is evaluated based on a resulting compression ratio and reconstruction quality. Compression ratio is directly related to the number of binary codes resulting from compression, with fewer binary codes resulting in better compression. Reconstruction quality is measured by comparing the reconstructed image/video with the original image/video, with greater similarity resulting in better reconstruction quality.

Image/video compression techniques can be divided into video coding methods and neural-network-based video compression methods. Video coding schemes adopt transform-based solutions, in which statistical dependency in latent variables, such as discrete cosine transform (DCT) and wavelet coefficients, is employed to carefully hand-engineer entropy codes to model the dependencies in the quantized regime. Neural network-based video compression can be grouped into neural network-based coding tools and end-to-end neural network-based video compression. The former is embedded into existing video codecs as coding tools and only serves as part of the framework, while the latter is a separate framework developed based on neural networks without depending on video codecs.

A series of video coding standards have been developed to accommodate the increasing demands of visual content transmission. The international organization for standardization (ISO)/International Electrotechnical Commission (IEC) has two expert groups, namely Joint Photographic Experts Group (JPEG) and Moving Picture Experts Group (MPEG). International Telecommunication Union (ITU) telecommunication standardization sector (ITU-T) also has a Video Coding Experts Group (VCEG), which is for standardization of image/video coding technology. The influential video coding standards published by these organizations include Joint Photographic Experts Group (JPEG), JPEG 2000, H.262, H.264/advanced video coding (AVC) and H.265/High Efficiency Video Coding (HEVC). The Joint Video Experts Team (WET), formed by MPEG and VCEG, developed the Versatile Video Coding (VVC) standard. An average of 50% bitrate reduction is reported by VVC under the same visual quality compared with HEVC.

Neural network-based image/video compression/coding is also under development. Example neural network coding network architectures are relatively shallow, and the performance of such networks is not satisfactory. Neural network-based methods benefit from the abundance of data and the support of powerful computing resources, and are therefore better exploited in a variety of applications. Neural network-based image/video compression has shown promising improvements and is confirmed to be feasible. Nevertheless, this technology is far from mature and a lot of challenges should be addressed.

Neural networks, also known as artificial neural networks (ANN), are computational models used in machine learning technology. Neural networks are usually composed of multiple processing layers, and each layer is composed of multiple simple but non-linear basic computational units. One benefit of such deep networks is a capacity for processing data with multiple levels of abstraction and converting data into different kinds of representations. Representations created by neural networks are not manually designed. Instead, the deep network including the processing layers is learned from massive data using a general machine learning procedure. Deep learning eliminates the necessity of hand-crafted representations. Thus, deep learning is regarded useful especially for processing natively unstructured data, such as acoustic and visual signals. The processing of such data has been a longstanding difficulty in the artificial intelligence field.

Neural networks for image compression can be classified in two categories, including pixel probability models and auto-encoder models. Pixel probability models employ a predictive coding strategy. Auto-encoder models employ a transform-based solution. Sometimes, these two methods are combined together.

Pixel probability modeling is now discussed. According to Shannon's information theory, the optimal method for lossless coding can reach the minimal coding rate, which is denoted as $-\log_2 p(x)$ where $p(x)$ is the probability of symbol x. Arithmetic coding is a lossless coding method that is believed to be among the optimal methods. Given a probability distribution $p(x)$, arithmetic coding causes the coding rate to be as close as possible to a theoretical limit $-\log_2 p(x)$ without considering the rounding error. Therefore, the remaining problem is to determine the probability, which is very challenging for natural image/video due to the curse of dimensionality. The curse of dimensionality refers to the problem that increasing dimensions causes data sets to become sparse, and hence rapidly increasing amounts of data is needed to effectively analyze and organize data as the number of dimensions increases.

Following the predictive coding strategy, one way to model $p(x)$ is to predict pixel probabilities one by one in a raster scan order based on previous observations, where x is an image, can be expressed as follows:

$$p(x)=p(x_1)p(x_2|x_1) \ldots p(x_i|x_{i-k}, \ldots, x_{i-1}) \ldots p(x_{m \times n}|x_1, \ldots, x_{m \times n-1}) \qquad (1)$$

where m and n are the height and width of the image, respectively. The previous observation is also known as the context of the current pixel. When the image is large, estimation of the conditional probability can be difficult. Thereby, a simplified method is to limit the range of the context of the current pixel as follows:

$$p(x)=p(x_1)p(x_2|x_1) \ldots p(x_i|x_{i-k}, \ldots, x_{i-1}) \ldots p(x_{m \times n}|x_{m \times n-k}, \ldots, x_{m \times n-1}) \qquad (2)$$

where k is a pre-defined constant controlling the range of the context.

It should be noted that the condition may also take the sample values of other color components into consideration. For example, when coding the red (R), green (G), and blue (B) (RGB) color component, the R sample is dependent on previously coded pixels (including R, G, and/or B samples), the current G sample may be coded according to previously coded pixels and the current R sample. Further, when coding the current B sample, the previously coded pixels and the current R and G samples may also be taken into consideration.

Neural networks may be designed for computer vision tasks, and may also be effective in regression and classification problems. Therefore, neural networks may be used to estimate the probability of $p(x_i)$ given a context $x_1$, $x_2, \ldots, x_{i-1}$. In an example neural network design, the pixel probability is employed for binary images according to $x_i \in \{-1, +1\}$. The neural autoregressive distribution estimator (NADE) is designed for pixel probability modeling. NADE is a feed-forward network with a single hidden layer. In another example, the feed-forward network may include connections skipping the hidden layer. Further, the parameters may also be shared. Such neural networks are used to perform experiments on the binarized (Modified National Institute of Standards and Technology) MNIST dataset. In an example, NADE is extended to a real-valued NADE (RNADE) model, where the probability $p(x_i|x_1, \ldots, x_{i-1})$ is derived with a mixture of Gaussians. The RNADE model feed-forward network also has a single hidden layer, but the hidden layer employs rescaling to avoid saturation and uses a rectified linear unit (ReLU) instead of sigmoid. In another example, NADE and RNADE are improved by using reorganizing the order of the pixels and with deeper neural networks.

Designing advanced neural networks plays an important role in improving pixel probability modeling. In an example neural network, a multi-dimensional long short-term memory (LSTM) is used. The LSTM works together with mixtures of conditional Gaussian scale mixtures for probability modeling. LSTM is a special kind of recurrent neural networks (RNNs) and may be employed to model sequential data. The spatial variant of LSTM may also be used for images. Several different neural networks may be employed, including recurrent neural networks (RNNs) and convolutional neural networks (CNNs), such as Pixel RNN (PixelRNN) and Pixel CNN (PixelCNN), respectively. In PixelRNN, two variants of LSTM, denoted as row LSTM and diagonal bidirectional LSTM (BiLSTM) are employed. Diagonal BiLSTM is specifically designed for images. PixelRNN incorporates residual connections to help train deep neural networks with up to twelve layers. In PixelCNN, masked convolutions are used to adjust for the shape of the context. PixelRNN and PixelCNN are more dedicated to natural images. For example, PixelRNN and PixelCNN consider pixels as discrete values (e.g., 0, 1, . . . , 255) and predict a multinomial distribution over the discrete values. Further, PixelRNN and PixelCNN deal with color images in RGB color space. In addition, PixelRNN and PixelCNN work well on the large-scale image dataset image network (ImageNet). In an example, a Gated PixelCNN is used to improve the PixelCNN. Gated PixelCNN achieves comparable performance with PixelRNN, but with much less complexity. In an example, a PixelCNN++ is employed with the following improvements upon PixelCNN: a discretized logistic mixture likelihood is used rather than a 256-way multinomial distribution; down-sampling is used to capture structures at multiple resolutions; additional short-cut connections are introduced to speed up training; dropout is adopted for regularization; and RGB is combined for one pixel. In another example, PixelSNAIL combines casual convolutions with self-attention.

Most of the above methods directly model the probability distribution in the pixel domain. Some designs also model the probability distribution as conditional based upon explicit or latent representations. Such a model can be expressed as:

$$p(x|h) = \Pi_{i=1}^{m \times n} p(x_i|x_1, \ldots, x_{i-1}, h) \qquad (3)$$

where h is the additional condition and $p(x)=p(h)p(x|h)$ indicates the modeling is split into an unconditional model and a conditional model. The additional condition can be image label information or high-level representations.

An Auto-encoder is now described. The auto-encoder is trained for dimensionality reduction and include an encoding component and a decoding component. The encoding component converts the high-dimension input signal to low-dimension representations. The low-dimension representations may have reduced spatial size, but a greater number of channels. The decoding component recovers the high-dimension input from the low-dimension representation. The auto-encoder enables automated learning of representations and eliminates the need of hand-crafted features, which is also believed to be one of the most important advantages of neural networks.

FIG. 1 is a schematic diagram illustrating an example transform coding scheme 100. The original image x is transformed by the analysis network $g_a$ to achieve the latent representation y. The latent representation y is quantized (q) and compressed into bits. The number of bits R is used to measure the coding rate. The quantized latent representation ŷ is then inversely transformed by a synthesis network $g_s$ to obtain the reconstructed image x̂. The distortion (D) is calculated in a perceptual space by transforming x and x̂ with the function $g_p$, resulting in z and ẑ, which are compared to obtain D.

An auto-encoder network can be applied to lossy image compression. The learned latent representation can be encoded from the well-trained neural networks. However, adapting the auto-encoder to image compression is not trivial since the original auto-encoder is not optimized for compression, and is thereby not efficient for direct use as a trained auto-encoder. In addition, other major challenges exist. First, the low-dimension representation should be quantized before being encoded. However, the quantization is not differentiable, which is required in backpropagation while training the neural networks. Second, the objective under a compression scenario is different since both the distortion and the rate need to be take into consideration. Estimating the rate is challenging. Third, a practical image coding scheme should support variable rate, scalability, encoding/decoding speed, and interoperability. In response to these challenges, various schemes are under development.

An example auto-encoder for image compression using the example transform coding scheme 100 can be regarded as a transform coding strategy. The original image x is transformed with the analysis network $y=g_a(x)$, where y is the latent representation to be quantized and coded. The synthesis network inversely transforms the quantized latent representation ŷ back to obtain the reconstructed image $\hat{x}=g_s(\hat{y})$. The framework is trained with the rate-distortion loss function, $\mathcal{L}=D+\lambda R$, where D is the distortion between x and x̂, R is the rate calculated or estimated from the quantized representation ŷ, and λ is the Lagrange multiplier. D can be calculated in either pixel domain or perceptual domain. Most example systems follow this prototype and the differences between such systems might only be the network structure or loss function.

In terms of network structure, RNNs and CNNs are the most widely used architectures. In the RNNs relevant category, an example general framework for variable rate image compression uses RNN. The example uses binary quantization to generate codes and does not consider rate during training. The framework provides a scalable coding functionality, where RNN with convolutional and deconvolution layers performs well. Another example offers an improved version by upgrading the encoder with a neural network similar to PixelRNN to compress the binary codes. The performance is better than JPEG on a Kodak image dataset using multi-scale structural similarity (MS-SSIM) evaluation metric. Another example further improves the RNN-based solution by introducing hidden-state priming. In addition, an SSIM-weighted loss function is also designed, and a spatially adaptive bitrates mechanism is included. This example achieves better results than better portable graphics (BPG) on the Kodak image dataset using MS-SSIM as evaluation metric. Another example system supports spatially adaptive bitrates by training stop-code tolerant RNNs.

Another example proposes a general framework for rate-distortion optimized image compression. The example system uses multiary quantization to generate integer codes and considers the rate during training. The loss is the joint rate-distortion cost, which can be mean square error (MSE) or other metrics. The example system adds random noise to stimulate the quantization during training and uses the differential entropy of the noisy codes as a proxy for the rate. The example system uses generalized divisive normalization (GDN) as the network structure, which includes a linear mapping followed by a nonlinear parametric normalization. The effectiveness of GDN on image coding is verified. Another example system includes improved version that uses three convolutional layers each followed by a down-sampling layer and a GDN layer as the forward transform. Accordingly, this example version uses three layers of inverse GDN each followed by an up-sampling layer and convolution layer to stimulate the inverse transform. In addition, an arithmetic coding method is devised to compress the integer codes. The performance is reportedly better than JPEG and JPEG 2000 on Kodak dataset in terms of MSE. Another example improves the method by devising a scale hyper-prior into the auto-encoder. The system transforms the latent representation y with a subnet $h_a$ to $z=h_a(y)$ and z is quantized and transmitted as side information. Accordingly, the inverse transform is implemented with a subnet $h_s$ that decodes from the quantized side information $\hat{z}$ to the standard deviation of the quantized $\hat{y}$, which is further used during the arithmetic coding of $\hat{y}$. On the Kodak image set, this method is slightly worse than BGP in terms of peak signal to noise ratio (PSNR). Another example system further exploits the structures in the residue space by introducing an autoregressive model to estimate both the standard deviation and the mean. This example uses a Gaussian mixture model to further remove redundancy in the residue. The performance is on par with VVC on the Kodak image set using PSNR as evaluation metric.

Usage of neural networks for video compression is now discussed. Similar to video coding technologies, neural image compression serves as the foundation of intra compression in neural network-based video compression. Thus, development of neural network-based video compression technology is behind development of neural network-based image compression because neural network-based video compression technology is of greater complexity and hence needs far more effort to solve the corresponding challenges. Compared with image compression, video compression needs efficient methods to remove inter-picture redundancy. Inter-picture prediction is then a major step in these example systems. Motion estimation and compensation is widely adopted in video codecs, but is not generally implemented by trained neural networks.

Neural network-based video compression can be divided into two categories according to the targeted scenarios: random access and the low-latency. In random access case, the system allows decoding to be started from any point of the sequence, typically divides the entire sequence into multiple individual segments, and allows each segment to be decoded independently. In a low-latency case, the system aims to reduce decoding time, and thereby temporally previous frames can be used as reference frames to decode subsequent frames.

Low-latency systems are now discussed. An example system employs a video compression scheme with trained neural networks. The system first splits the video sequence frames into blocks and each block is coded according to an intra coding mode or an inter coding mode. If intra coding is selected, there is an associated auto-encoder to compress the block. If inter coding is selected, motion estimation and compensation are performed and a trained neural network is used for residue compression. The outputs of auto-encoders are directly quantized and coded by the Huffman method.

Another neural network-based video coding scheme employs PixelMotionCNN. The frames are compressed in the temporal order, and each frame is split into blocks which are compressed in the raster scan order. Each frame is first extrapolated with the preceding two reconstructed frames. When a block is to be compressed, the extrapolated frame along with the context of the current block are fed into the PixelMotionCNN to derive a latent representation. Then the residues are compressed by a variable rate image scheme. This scheme performs on par with H.264.

Another example system employs an end-to-end neural network-based video compression framework, in which all the modules are implemented with neural networks. The scheme accepts a current frame and a prior reconstructed frame as inputs. An optical flow is derived with a pre-trained neural network as the motion information. The motion information is warped with the reference frame followed by a neural network generating the motion compensated frame. The residues and the motion information are compressed with two separate neural auto-encoders. The whole framework is trained with a single rate-distortion loss function. The example system achieves better performance than H.264.

Another example system employs an advanced neural network-based video compression scheme. The system inherits and extends video coding schemes with neural networks with the following major features. First the system uses only one auto-encoder to compress motion information and residues. Second, the system uses motion compensation with multiple frames and multiple optical flows. Third, the system uses an on-line state that is learned and propagated through the following frames over time. This scheme achieves better performance in MS-SSIM than HEVC reference software.

Another example system uses an extended end-to-end neural network-based video compression framework. In this example, multiple frames are used as references. The example system is thereby able to provide more accurate prediction of a current frame by using multiple reference frames and associated motion information. In addition, a motion field prediction is deployed to remove motion redundancy along temporal channel. Postprocessing networks are also used to remove reconstruction artifacts from previous processes. The performance of this system is better than H.265 by a noticeable margin in terms of both PSNR and MS-SSIM.

Another example system uses scale-space flow to replace an optical flow by adding a scale parameter based on a framework. This example system may achieve better performance than H.264. Another example system uses a multi-resolution representation for optical flows based. Concretely, the motion estimation network produces multiple optical flows with different resolutions and let the network learn which one to choose under the loss function. The performance is slightly better than H.265.

Systems that employ random access are now discussed. Another example system uses a neural network-based video compression scheme with frame interpolation. The key frames are first compressed with a neural image compressor and the remaining frames are compressed in a hierarchical order. The system performs motion compensation in the perceptual domain by deriving the feature maps at multiple spatial scales of the original frame and using motion to warp the feature maps. The results are used for the image compressor. The method is on par with H.264.

An example system uses a method for interpolation-based video compression. The interpolation model combines motion information compression and image synthesis. The same auto-encoder is used for image and residual. Another example system employs a neural network-based video compression method based on variational auto-encoders with a deterministic encoder. Concretely, the model includes an auto-encoder and an auto-regressive prior. Different from previous methods, this system accepts a group of pictures (GOP) as inputs and incorporates a three dimensional (3D) autoregressive prior by taking into account of the temporal correlation while coding the latent representations. This system provides comparative performance as H.265.

Preliminaries are now discussed. Almost all the natural image and/or video is in digital format. A grayscale digital image can be represented by $x \in \mathbb{D}^{m \times n}$, where $\mathbb{D}$ is the set of values of a pixel, m is the image height, and n is the image width. For example, $\mathbb{D} = \{0, 1, 2, \ldots, 255\}$ is an example setting, and in this case $|\mathbb{D}| = 256 = 2^8$. Thus, the pixel can be represented by an 8-bit integer. An uncompressed grayscale digital image has 8 bits-per-pixel (bpp), while compressed bits are definitely less.

A color image is typically represented in multiple channels to record the color information. For example, in the RGB color space an image can be denoted by $x \in \mathbb{D}^{m \times n \times 3}$ with three separate channels storing Red, Green, and Blue information. Similar to the 8-bit grayscale image, an uncompressed 8-bit RGB image has 24 bpp. Digital images/videos can be represented in different color spaces. The neural network-based video compression schemes are mostly developed in RGB color space while the video codecs typically use a YUV color space to represent the video sequences. In YUV color space, an image is decomposed into three channels, namely luma (Y), blue difference chroma (Cb) and red difference chroma (Cr). Y is the luminance component and Cb and Cr are the chroma components. The compression benefit to YUV occur because Cb and Cr are typically down sampled to achieve pre-compression since human vision system is less sensitive to chroma components.

A color video sequence is composed of multiple color images, also called frames, to record scenes at different timestamps. For example, in the RGB color space, a color video can be denoted by $X = \{x_0, x_1, \ldots, x_t, \ldots, x_{T-1}\}$ where T is the number of frames in a video sequence and $x \in \mathbb{D}^{m \times n}$. If m=1080, n=1920, $|\mathbb{D}|=2^8$, and the video has 50 frames-per-second (fps), then the data rate of this uncompressed video is 1920×1080×8×3×50=2,488,320,000 bits-per-second (bps). This results in about 2.32 gigabits per second (Gbps), which uses a lot storage and should be compressed before transmission over the internet.

Usually the lossless methods can achieve a compression ratio of about 1.5 to 3 for natural images, which is clearly below streaming requirements. Therefore, lossy compression is employed to achieve a better compression ratio, but at the cost of incurred distortion. The distortion can be measured by calculating the average squared difference between the original image and the reconstructed image, for example based on MSE. For a grayscale image, MSE can be calculated with the following equation.

$$MSE = \frac{\|x - \hat{x}\|^2}{m \times n} \quad (4)$$

Accordingly, the quality of the reconstructed image compared with the original image can be measured by peak signal-to-noise ratio (PSNR):

$$PSNR = 10 \times \log_{10} \frac{(\max(\mathbb{D}))^2}{MSE} \quad (5)$$

where $\max(\mathbb{D})$ is the maximal value in $\mathbb{D}$, e.g., 255 for 8-bit grayscale images. There are other quality evaluation metrics such as structural similarity (SSIM) and multi-scale SSIM (MS-SSIM). To compare different lossless compression schemes, the compression ratio given the resulting rate, or vice versa, can be compared. However, to compare different lossy compression methods, the comparison has to take into account both the rate and reconstructed quality. For example, this can be accomplished by calculating the relative rates at several different quality levels and then averaging the rates. The average relative rate is known as Bjontegaard's delta-rate (BD-rate). There are other aspects to evaluate image and/or video coding schemes, including encoding/decoding complexity, scalability, robustness, and so on.

Figure 2:
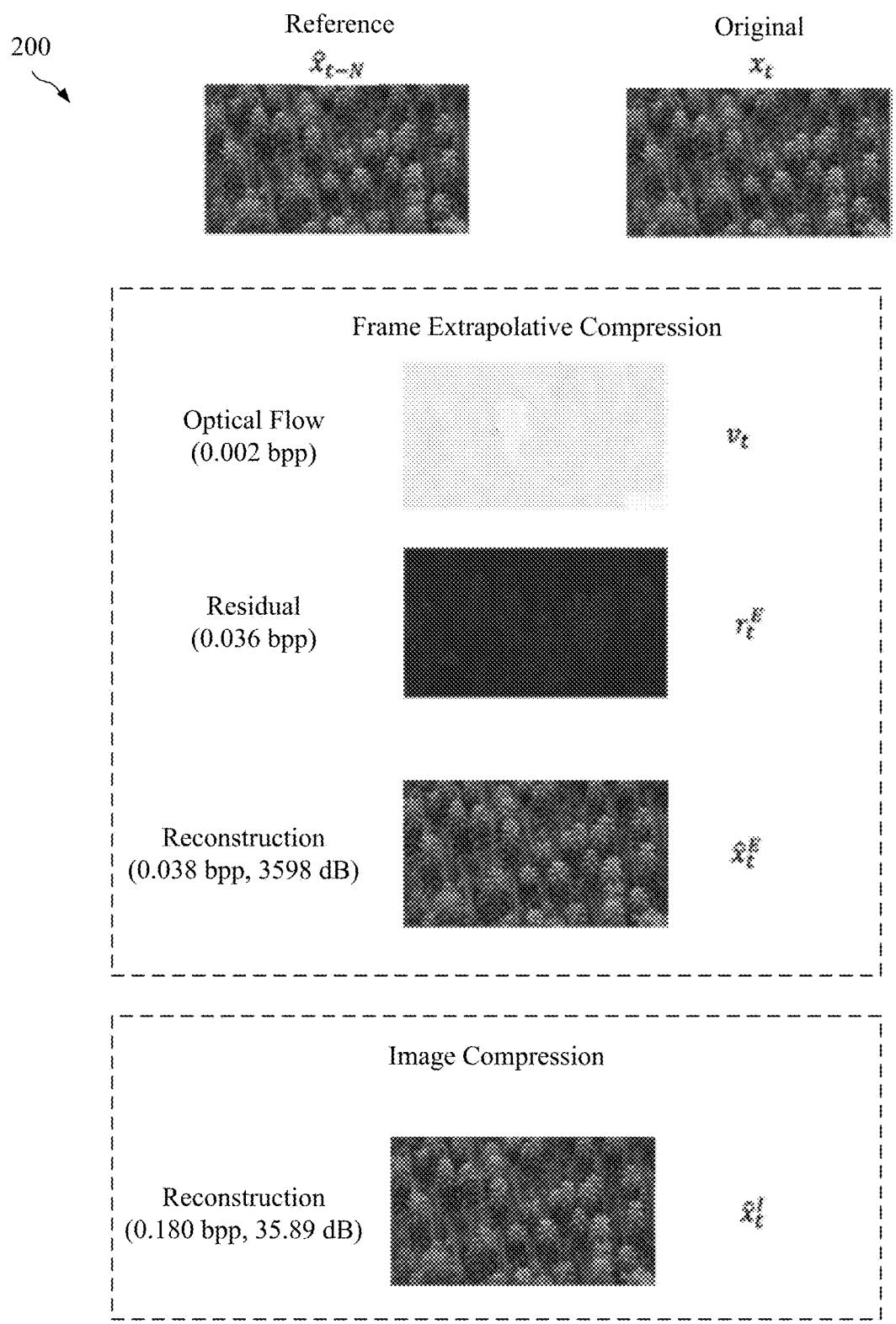
FIG. 2 is a schematic diagram illustrating a comparison compression schemes.

FIG. 2 is a schematic diagram illustrating a comparison compression schemes 200. A scheme for compressing a key frame with an intra-predictive method (e.g., an image compression method) is compared with a scheme for compressing a key frame with an inter-predictive method (e.g., frame extrapolative compression method). The frames are from a HoneyBee sequence in the ultra video group (UVG) dataset. The results show that video content with simple motions but rich textures are more suitable for inter-predictive compression.

The following are example technical problems solved by disclosed technical solutions. For random-access scenarios, example systems use image compression methods to compress the first frame and the last frame, also known as key frames. The remaining frames are interpolated from previously reconstructed frames. However, solely using image compression for the key frames fails to take into consideration of the temporal correlations. As shown in FIG. 2, frame extrapolative compression (FEC) and image compression can be used to compress the current frame $x_t$. Results show that frame extrapolative compression method yields much better R-D performance than the image compression method. Therefore, sequences with rich textures and simple motions are more suitable for inter-predictive compression schemes.

Disclosed herein are mechanisms to address one or more of the problems listed above. The disclosure includes an end-to-end neural network-based video codec. The codec includes a plurality of compression networks. The codec can receive a video including a plurality of frames. The codec can then code different fames with different compression networks. This can be accomplished by selecting a compression network for each frame based on predetermined and/or learned characteristic, such as based on motion between frames and/or image textures. In another example, this can be accomplished by coding each frame with a plurality of the image compression networks and selecting the image compression network that provides the best combination of compression and image distortion. In an example, the end-to-end neural network-based video codec includes a bilateral predictive learned compression (BPLC) component and a spatial-temporal adaptive compression (STAC) component. Key frames can be coded by the STAC component and non-key frames can be coded by the BPLC component. The BPLC component employs a bi-prediction network, a residual auto-encoder and a biprediction residual refine network to obtain the compressed frame. The STAC component can also include a frame extrapolative compression (FEC) branch and an image compression branch. The FEC branch uses a combination of motion estimation (ME), motion vector compression, motion compensation, residual compression and residual refinement to obtain a compressed frame. The image compression branch contains a latent representation from the frame and quantizes the latent representation to obtain the compressed frame. In an example, frames classified as having rich textures and simple motions are compressed by the FEC branch while frames non-rich textures and/or complex motions are compressed by the image compression branch. Such classifications can be performed by a neural network and/or by comparison with predetermined and/or learned parameters.

To solve the above problems, and others, methods as summarized below are disclosed. The items should be considered as examples to explain the general concepts and should not be interpreted in a narrow way. Furthermore, these items can be applied individually or combined in any manner. The techniques described herein provide a neural network-based video compression method with spatial-temporal adaptation. To be more specific, for a video unit (e.g., a frame, a picture, and/or a slice) to be coded/decoded, either an extrapolation process (by using reconstructed samples in another video unit) or an image compressor (by using the information within the current video unit) could be selected. In the following discussion, a frame, a picture, and an image may have the same meaning.

Example 1

In one example, the extrapolation process is achieved by introducing a FEC module to the end-to-end neural network-based video codec. By including a FEC module, the current video unit can be compressed either by the image compressor or the FEC module. In one example, the FEC module uses at least one previous coded frame as the reference to predict current video unit. The indication regarding the motion information between the current video unit and the reference frame is signaled in a bitstream or derived implicitly by the decoder. In one example, the FEC module uses two or more previous coded frames as references to predict a current video unit. The indication regarding the motion information between the current video unit and reference frames can be signaled in a bitstream or derived implicitly by the decoder. In one example, the FEC module uses two or more previous coded frames to extrapolate a current video unit without signaling motion information. In one example, the reference pictures used in FEC should be prior to the current picture in the displaying order.

Example 2

In one example, the reconstructed frame with a minimal cost (such as R-D loss) are saved in the reconstructed frame buffer at the encoder side. In an example, an indication of the compression method utilized (e.g., FEC or image compressor) is present in a bitstream. In an example, the decoding process and/or the reconstruction process is dependent on the indication. In an example, the video unit may be a key frame, and/or a frame coded right after another key frame, such as an intra coded frame or a frame coded with FEC. In one example, a same or two different end-to-end NN-based methods may be used to code the frame with the FEC compressor or with the image compressor. In one example, an end-to-end NN-based method may be used to compress the motion information.

Example 3

In another example, an end-to-end trainable neural network-based video codec is used to provide improved R-D performance. The codec comprises a spatial-temporal adaptive compression (STAC) module and a bilateral predictive learned compression (BPLC) module dedicated for key frame and non-key frame compression. The spatial-temporal adaptive compression comprises multiple branches which are able to remove both spatial and temporal redundancies in key frames. In one example, the STAC might include at least an image compressor and an extrapolation-based compression method. In one example, the BPLC can use at least two reference frames, such as one preceding reference frame and one succeeding reference frame (in terms of display order), to interpolate the current frame. In one example, the BPLC can use more than two reference frames to predict the current frame. In one example, the BPLC might follow a hierarchical order to interpolate the frames.

Example 4

In another example, instead of solely using image compression methods to compress the key frames, a spatial-temporal adaptive compression can also be used. In one example, for a video sequence to be compressed, an inter-predictive compression method is used in conjunction with an image compressor for compressing the key frames. In one example, the previously reconstructed key frame can be used to predict current key frame. In one example, the motion information can be use explicitly or implicitly to derive the predicted frame. In one example, either a preceding reconstructed frame or a succeeding reconstructed frame might be used as the reference frame. In one example, multiple reference frames might be used to derive the predicted frame.

Example 5

In one example, more than one inter-predictive compression methods might be employed. In one example, a flow-based method can be used in conjunction with a kernel-based method to derive the predicted frame. The flow based method may explicitly derive an optical flow and encoding. A kernel-based method may derive the predicted frame using a learned kernel convolved with reference frames without deriving optical flow. In one example, a forward prediction and backward prediction might be combined in a certain form to make the final predicted frame. In one example, the selection of the inter-predictive compression method may be signaled in the bitstream or derived by the decoder.

Example 6

In one example, more than one intra-predictive compression methods might be employed. In one example, different image compression networks/implementations can be provided as intra-predictive compression methods. In one example, different block-levels can be used together. For example, block-level and frame-level predictions can be used in combination. In one example, the selection of the intra-predictive compression method may be signaled in the bitstream or derived by the decoder.

Example 7

In one example, more than one motion compression methods might be employed. In one example, different motion compression networks and/or implementations can be provided as motion compression methods. In one example, different block-levels can be used together. For example, block-level and frame-level predictions can be used in combination. In one example, the selection of the motion compression method may be signaled in the bitstream or derived by the decoder.

Example 8

In one example, a compression mode decision might be made before coding the frame instead of doing a multiple-pass compression, which reduces the run time complexity. In one example, the motion information between two certain frames might be used to decide whether the inter-predictive scheme should be selected. For example, a motion magnitude smaller than a threshold should be considered to use the inter-predictive scheme. In one example, the entropy of a frame might be used to determine if a current key should be compressed with the intra-predictive scheme. For example, an entropy smaller than a threshold should be considered to use the intra-predictive scheme. In one example, multiple criteria can be used in conjunction to determine the compression mode.

Example 9

In one example, the extrapolated frame is used as additional information to enhance residual coding. In one example, the extrapolated frame is concatenated with the residual frame and then taken as input at both encoder and decoder side. In one example, the individual features are first extracted from the interpolated frame and the residue frame, and then the individual features are fused together at both encoder and decoder side. In one example, the extrapolated frame is only used in the decoder side to help improve the quality of reconstructed residue frame.

Example 10

In the above examples, the video unit could be a picture, a slice, a tile, a subpicture, a coding tree unit (CTU) row, a CTU, a coding tree block (CTB), a coding unit (CU), a prediction unit (PU), a transform unit (TU), a coding block (CB), a transform block (TB), a virtual pipeline data unit (VPDU), a region within a picture, a region within a slice, a region within a tile, a region within a subpicture, one or multiple pixels and/or samples within a CTU, or combinations thereof.

Example 11

Figure 3:
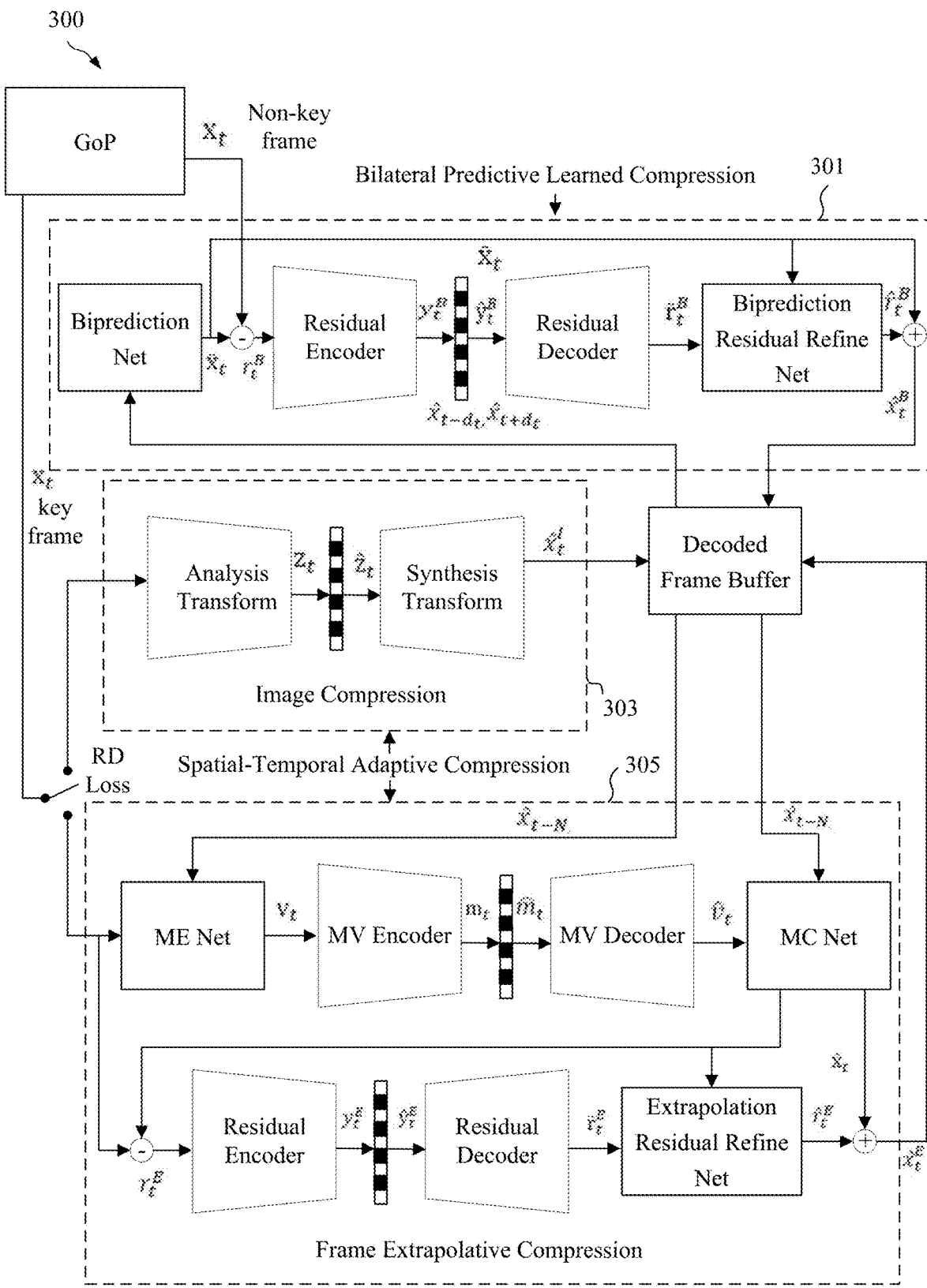
FIG. 3 is a schematic diagram illustrating an example neural network framework.

In one example, an end-to-end motion compression network is designed as a motion vector (MV) encoder-decoder as shown in FIG. 3 below. In one example, an end-to-end FEC network is designed as shown in FIG. 3 below.
An example embodiment is now described. There are two common types of redundancy in video signals, spatial redundancy and temporal redundancy. Some neural network-based video compression methods only apply image compression for the key frames in random-access scenarios. This approach might deteriorate the R-D performance by neglecting the temporal redundancy. The present neural network embodiment uses both intra-predictive compression and inter-predictive compression for key frames in random-access scenarios. The most optimal solution is selected based on the R-D loss of the reconstructed frames from each of the schemes and the original frame. An example is provided in the following subsections.

FIG. 3 is a schematic diagram illustrating an example neural network framework 300. In neural network framework 300, the raw video sequences are divided into group of pictures (GOP). In each GOP, the keyframes are compressed with the spatial-temporal adaptive compression (STAC) component including an image compression branch 303 and a frame extrapolative compression (FEC) branch 305. The remaining frames are compressed with the bilateral predictive learned compression (BPLC) component 301.

Notations used in FIG. 3 are as follows. The original video sequence (V) is denoted as $\mathcal{V} = \{x_0, x_1, \ldots, x_t, \ldots\}$ where $x_t$ is a frame at time t. Every N-th frame is set as a key frame and the remaining N−1 frames between two key frames are interpolated. The frames are organized into GoPs and two consecutive GoPs share the same boundary frame. In the present document superscripts I, E, and B denote the variables used in branch Image Compression, Frame Extrapolative Compression, and Bi-Prediction Learned Compression, respectively, as shown in neural network framework 300. $v_t$ and $\hat{v}_t$ denote the original and reconstructed motion vector (MV) fields, respectively. $\bar{x}$ and $\tilde{x}$ are the predicted frame from the bi-prediction network (Bi-prediction Net) and the motion compensation network (MC Net), respectively. $r_t$ and $\hat{r}_t$ are the original residual and the reconstructed residual from the residual auto-encoders, respectively. The final decoded residual after residual refine network is $\check{r}_t$. $z_t$, $m_t$, and $y_t$ represent the latent representations of image compression, MV, and residual, respectively. $\hat{z}_t$, $\hat{m}_t$ and $\hat{m}_t$ are the quantized latents. The final decoded frame is denoted as $\hat{x}_t$.

Neural network framework 300 includes the STAC component and the BPLC component 301. The STAC component is utilized to compress the key frames and the BPLC component 301 is used to compress the remaining frames between two key frames. The frames between key frames may be known as non-key frames and/or interpolated frames. The STAC component comprises two an image compression branch 303 and FEC branch 305. For a video sequence $\mathcal{V}$, the first frame $x_0$ is compressed with the image compression branch 303 branch since there are no available reference frames. The following key frames are compressed by either of these two branches (image compression branch 303 and/or FEC branch 305). In the training stage, the first frame in a GoP is used to train the image compression branch 303 and the last frame to train the FEC branch 305. While in inference stage, a two-pass compression is performed on the key frame. The reconstructed frame with minimal RD loss is selected and saved in the reconstructed frame buffer for future use. After the key frames are compressed, the remaining frames are compressed with the BPLC component 301.

Spatial-temporal adaptation is now discussed. There are two common types of redundancy in video signals, spatial redundancy and temporal redundancy. In most video codecs, intra coding and inter coding are two primary techniques to remove spatial redundancy and temporal redundancy, respectively. Motion and texture are two factors that determine whether inter-predictive coding or intra-predictive coding is more suitable for a sequence. Empirically, video content can be classified based on the motion and texture characteristics. Motion can be simple or complex and texture can be plain or rich. Complex motion comes in two types and/or is sometimes mixed together. First, the motion information in complex motion may be difficult to estimate with motion estimation (ME) techniques. Second, coding the motion information for complex motion may require excessive bits, which leads to an inferior R-D performance compared with intra-predictive coding. For example, some video sequences might only contain a specific motion, like translation while others might contain a combination of multiple motions, like translation, rotation, and zoom-in/out. Similarly, some video sequences contain plain textures, like large portion of sky and/or unicolor objects, while others might contain rich textures, like bushes, grass, and architectures.

Intra-predictive coding is preferable for video content with plain textures but complex motions, whilst inter-predictive coding is preferable for video content with simple motions but rich textures. As shown in FIG. 2, the sequence HoneyBee contains very tiny motions between frames, but each frame contains rich textures. Introducing FEC branch 305 with optical flow can efficiently remove the correlations. With only 21% of the bits required by the image compression branch 303, the FEC branch 305 achieves even better reconstruction quality. However, using only inter-predictive coding is not optimal. Some video sequences have plain textures but very complex motions. In this case, the image compression branch 303 performs better than the FEC branch 305. Therefore, the neural network framework 300 combines the image compression branch 303 and the FEC branch 305 to build the STAC component for key frames in the learned video compression paradigm.

Accordingly, the STAC component is used for key frames. The objective of the STAC component is formulated as:

$$\hat{x}_t = \underset{s \in \{\hat{x}_t^I, \hat{x}_t^E\}}{\operatorname{argmin}} \{\lambda D(x_t, s) + R_t^{resi} + R_t^{mv}\} \quad (6)$$

where $\lambda$ is the Lagrange multiplier; $\hat{x}_t^I$ and $\hat{x}_t^E$ represent the decoded frame from the image compression branch 303 and FEC branch 305, respectively; and $R_t^{resi}$ and $R_t^{mv}$ denote the bits to encode residual and motion vector, respectively. For image compression, $R_t^{mv}$ is set to zero. The derivation of $\hat{x}_t^I$ and $\hat{x}_t^E$ can be formulated as:

$$\hat{x}_t^I = H_\theta(x_t), \hat{x}_t^E = H_\psi(x_t, \hat{x}_{t-N}) \quad (7)$$

where $\theta$ and $\psi$ are the optimized parameters. A deep auto-encoder is used as the image compression network in the image compression branch 303. The image compression branch 303 includes an analysis transform component and a synthesis transform component. The analysis transform component obtains a latent representation $z_t$ from a key frame $x_t$. The latent representation $z_t$ is quantized to obtain quantized latents $\hat{z}_t$. The synthesis transform component transforms the quantized latents $\hat{z}_t$ to obtain an image compression decoded frame $x_t^I$.

The FEC is now discussed. The present disclosure considers three approaches to obtain a predicted key frame. Such approaches are shown in FIG. 3, FIG. 4, and FIG. 5.

Figure 4:
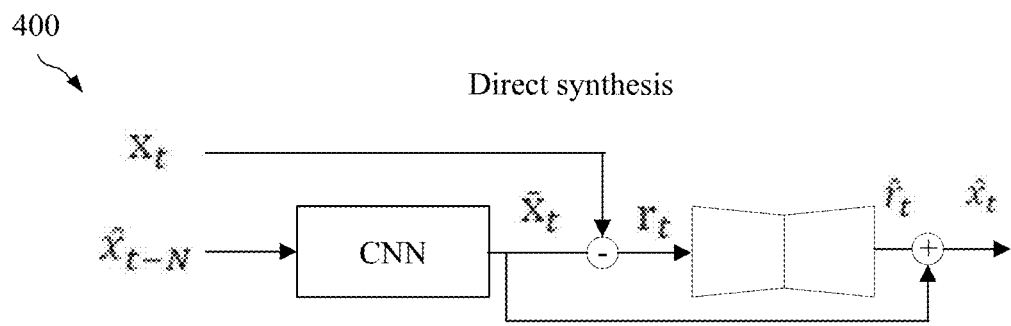
FIG. 4 is a schematic diagram illustrating a direct synthesis scheme for inter-predictive compression.

FIG. 4 is a schematic diagram illustrating a direct synthesis scheme 400 for obtaining a predicted key frame. The direct synthesis scheme 400 forwards a previously decoded key frame $\hat{x}_{t-N}$ through a CNN to obtain a predicted frame $\bar{x}_t$. The current frame $x_t$ is subtracted from the predicted frame $\bar{x}_t$ to obtain a residual $r_t$. The residual $r_t$ is forwarded through a refinement network to obtain a final decoded residual $\hat{r}_t$. The predicted frame $\bar{x}$ is then added to the final decoded residual $\hat{r}_t$ to obtain the final decoded frame $\hat{x}_t$.

Figure 5:
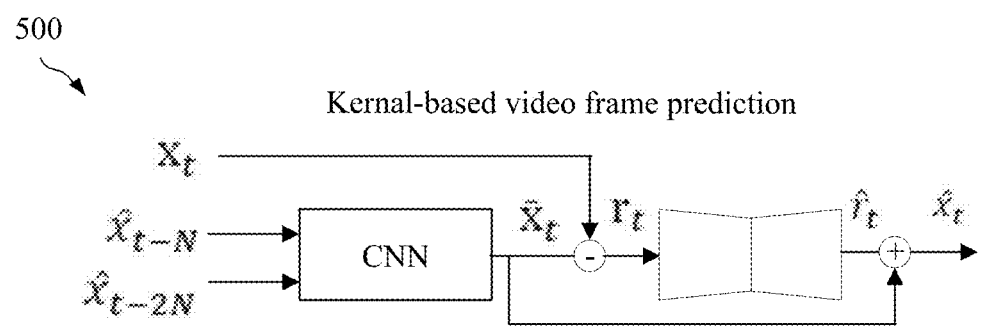
FIG. 5 is a schematic diagram illustrating a kernel-based scheme for inter-predictive compression.

FIG. 5 is a schematic diagram illustrating a kernel-based scheme 500 for obtaining a predicted key frame. Kernel-based scheme 500 is substantially similar to direct synthesis scheme 400. However, kernel-based scheme 500 employs a plurality of previously decoded key frame $\hat{x}_{t-N}, \hat{x}_{t-2N}, \ldots$ to generate the predicted frame $\bar{x}_t$.

Accordingly, the approaches to obtain a predicted key frame include a flow-based scheme as shown by FEC branch 305 in FIG. 3, the direct synthesis scheme 400 as shown in FIG. 5, and the kernel-based scheme 500 as shown in FIG. 5. Among these options, only the flow-based scheme in FEC branch 305 explicitly derives and encodes the motion information. In an example, the flow-based solution of FEC branch 305 is employed as the FEC model for the following reasons. First, key frame prediction is more challenging due to the larger temporal distance, which is usually accompanied with larger motions. Kernel-based methods have difficulty capturing large motions when the kernel size is smaller than the motion. Further, deciding the optimal kernel size is non-trivial considering the trade-off between the model size and the performance. Second, accurate motion estimation is a major factor in capturing the temporal correlations. The effectiveness of explicitly deriving the optical flow has been validated in practice. As shown in FIG. 3, the FEC branch 305 employs the following major steps to derive the decoded frame $\hat{x}_t^E$: motion estimation (ME), MV compression, motion compensation (MC), residual compression and residual refinement.

In FEC branch 305, motion estimation and compression is implemented by a pre-trained pyramid, warping, cost volume network (PWC-Net) used as a ME Net. Since the PWC-Net is trained with two consecutive frames, the present disclosure finetunes the PWC-Net on training data using the first frame and the last frame in a GoP. Due to scarcity of optical flow labels, L2 loss between the warped frame and the original frame is directly used to deploy the finetuning. An attention model is used as the MV compression auto-encoder. In an example, the number of feature maps are set to one hundred twenty-eight. The FEC branch 305 denotes the ME Net as $h_{me}$ and the MV auto-encoder as $\varepsilon_{mv}^E$, respectively. Motion estimation and compression are expressed as:

$$v_t = h_{me}(x_t, \hat{x}_{t-N}), R_{mv}, \hat{v}_t = \varepsilon_{mv}^E(v_t) \quad (8)$$

Motion compensation is now discussed. The MC Net includes a bilinear interpolation-based warping layer followed by a convolution neural network (CNN) to refine the warped frame. The MC Net is denoted as $h_{mc}$.

$$\tilde{x}_t = h_{mc}(\hat{x}_{t-N}, \hat{v}_t) \quad (9)$$

Figure 6:
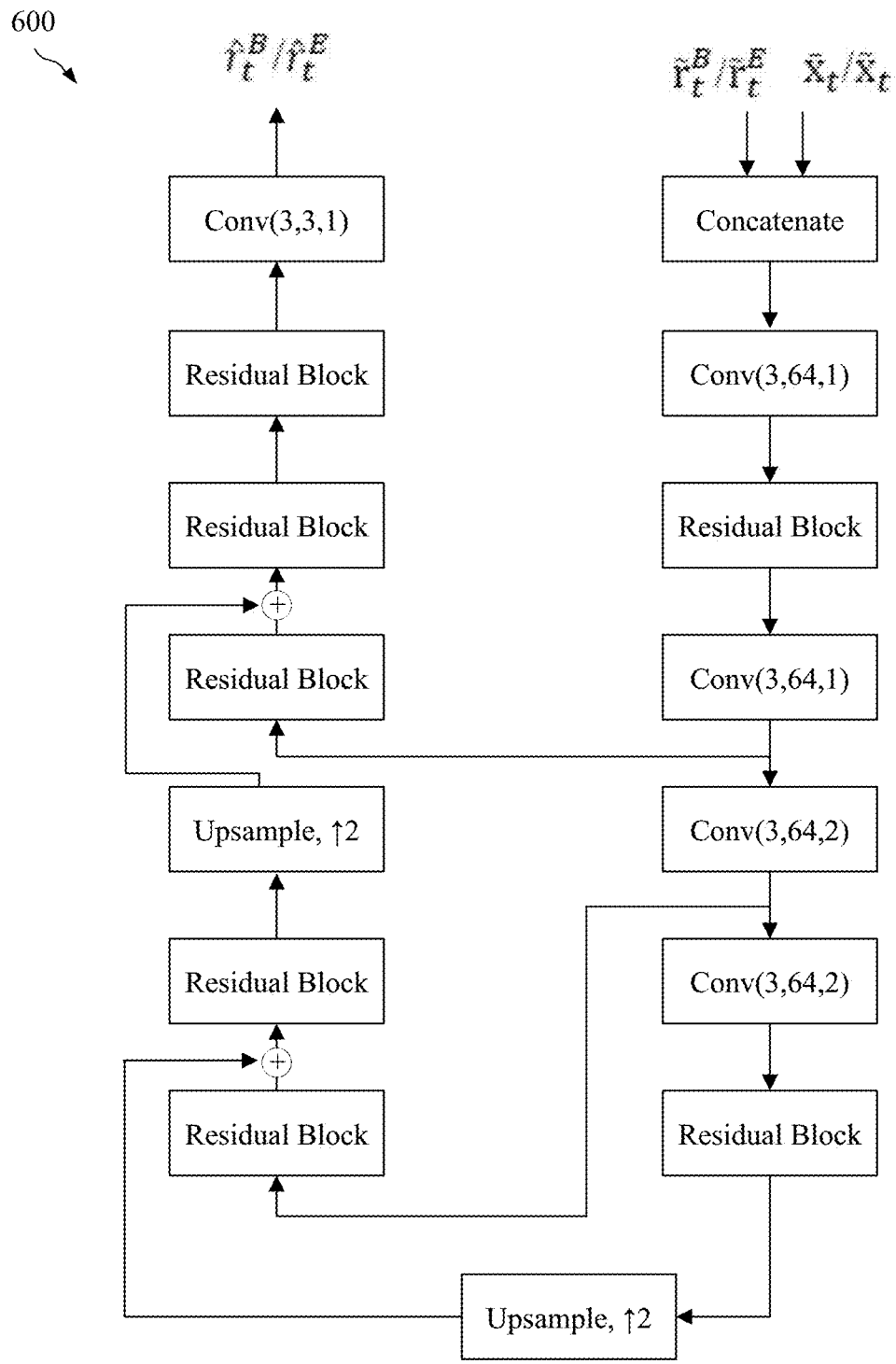
FIG. 6 is a schematic diagram illustrating an example residual refinement network.

Residual compression and refinement is now discussed. FIG. 6 is a schematic diagram illustrating an example residual refinement network 600, which can be employed to refine residual in FEC branch 305. In the residual refinement network 600 conv(3,64,1) represents a convolution layer with kernel size of 3×3, 64 output channels and stride of 1. A leaky rectified linear unit (ReLU) activation unit is used for the convolution layers. Each residual block includes two convolution layers.

Referring back to FIG. 3, after the predicted frame is obtained from the MC Net, the residual auto-encoder is used to compress the residual. The residual auto-encoder may share the same architecture with the MV auto-encoder but with one hundred ninety-two channels. To compensate for the error in previous stages, the residual refinement network 600 in FIG. 6 is used to enhance the quality of the reconstructed residual. The final decoded residual, denoted as $\hat{r}_t^E$, is output from the residual decoder in the FEC branch 305. The residual auto-encoder is denoted as $\varepsilon_{resi}^E$ and the residual refine network is denoted as $h_{rf}^E$, respectively. This procedure is expressed as:

$$R_{resi}^E, \tilde{r}_t^E = \varepsilon_{resi}^E(r_t^E), \hat{r}_t^E = h_{rf}^E(\tilde{r}_t^E, \tilde{x}_t) \tag{10}$$

The BPLC component 301 is now discussed. While the key frames are compressed by the STAC component, the remaining non-key frames are compressed with the BPLC component 301. The BPLC component 301 comprises a bi-prediction network, a residual auto-encoder and a biprediction residual refine network. The frames are interpolated in a hierarchical order to support random access. Two reference frames $\{\tilde{x}_{t-d_t}, \tilde{x}_{t+d_t}\}$ are identified based on a current frame $x_t$, where $d_t$ represents the temporal distance between $x_t$ and corresponding reference frames. When the GoP size N is an integral exponent of 2, $d_t$ is determined according to the temporal layer which $x_t$ is associated with:

$$d_t = \frac{N}{2^{\tau(x_t)}}, (\tau(x_t) \neq 0), \tau(x_t) = \begin{cases} 0, & \text{if } k = 1 \\ 1, & \text{if } k = \frac{N}{2} \\ 2, & \text{if } k = \frac{N}{4}, \frac{3N}{4} \\ \ldots \end{cases} \tag{11}$$

where $\tau(x_t)$ is the temporal ID of $x_t$, k is the index in a GoP, and $$k = t - \left\lfloor \frac{t}{N} \right\rfloor \cdot N.$$

Video frame interpolation via adaptive separable convolution (SepConv) is used as the biprediction residual refine network. Before joint training, the pre-trained model is finetuned on a dataset. Intuitively, separate models should be used for different temporal layers. However, experiments indicate no noticeable performance improvement is observed by using multiple bi-prediction networks. Accordingly, the present example uses a single network for all temporal layers. The biprediction residual refine network is finetuned using three consecutive frames. The residual auto-encoder may share the same structure as MV auto-encoder with one hundred ninety-two channels. The residual refine network may also share the same architecture as the extrapolation residual refinement network in the FEC branch 305. The bi-predictive learned compression component can be described as:

$$x_t = h_{bp}(\hat{x}_{t-d_t}, \hat{x}_{t+d_t}), \quad R_{resi}^B, \tilde{r}_t^B = \varepsilon_{resi}^B(r_t^B), \quad \hat{r}_t^B = h_{rf}^B(\tilde{r}_t^B, \tilde{x}_t) \tag{12}$$

where $h_{bp}$, $\varepsilon_{resi}^B$ and $h_{rf}^B$ denote the biprediction residual refine network, residual auto-encoder and biprediction residual refinement network, respectively.

Figure 7:
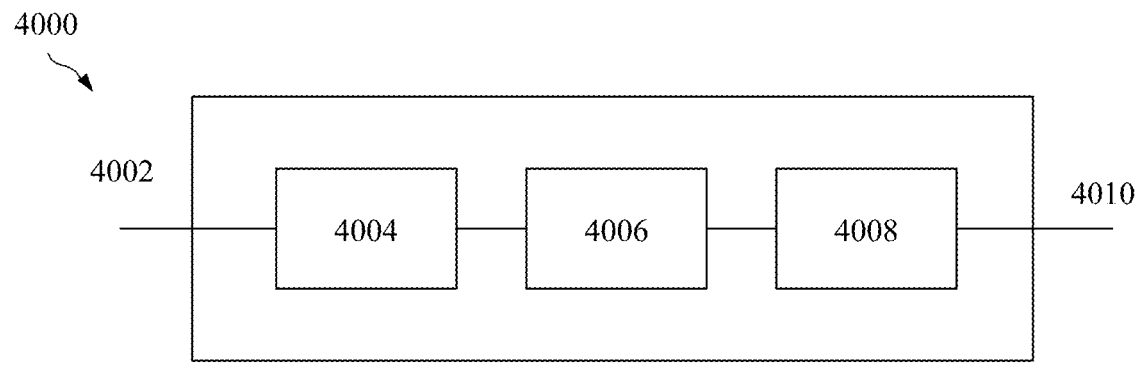
FIG. 7 is a block diagram showing an example video processing system.

FIG. 7 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4000 may include a coding component 4004 that may implement the various coding or encoding methods described in the present document. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 8:
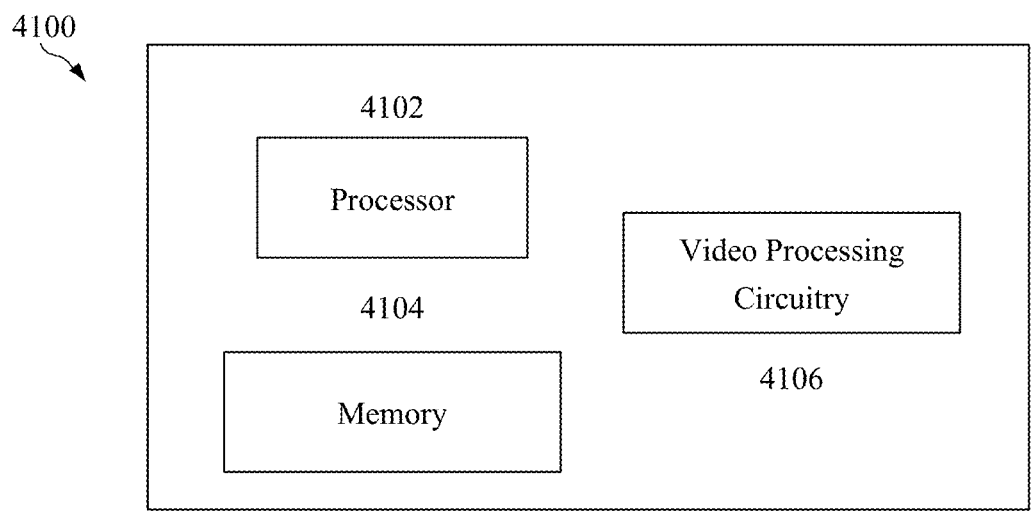
FIG. 8 is a block diagram of an example video processing apparatus.

FIG. 8 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present document. The memory (memories) 4104 may be used for storing data and code used for implementing the methods and techniques described herein. The video processing circuitry 4106 may be used to implement, in hardware circuitry, some techniques described in the present document. In some embodiments, the video processing circuitry 4106 may be at least partly included in the processor 4102, e.g., a graphics co-processor.

Figure 9:
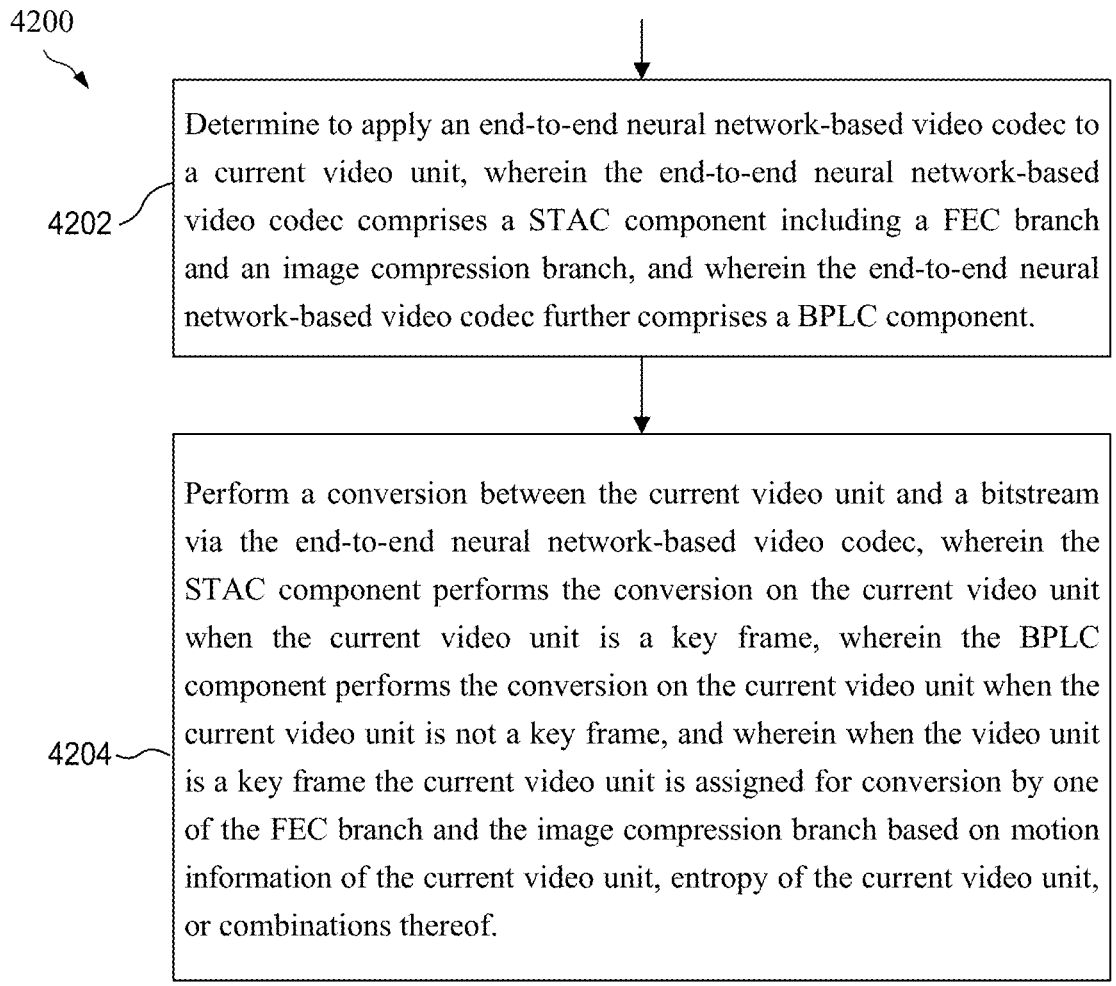
FIG. 9 is a flowchart for an example method of video processing.

FIG. 9 is a flowchart for an example method 4200 of video processing. The method 4200 includes determining to apply an end-to-end neural network-based video codec to a current video unit of a video at step 4202. The current video unit may be a picture, a slice, a tile, a subpicture, a CTU row, a CTU, a CTB, a CU, a PU, a TU, a CB, a TB, a VPDU, a region within a picture, a region within a slice, a region within a tile, a region within a subpicture, one or multiple pixels and/or samples within a CTU, or combinations thereof. In a specific example, the current video unit is a frame (also known as a picture). A video comprises both key frames, which can be used as random access points, and non-key frames that may not be useable as random access point due to inter-prediction related dependence between frames. The end-to-end neural network-based video codec comprises a plurality of components/branches to handle different frames. For example, the end-to-end neural network-based video codec may comprise a STAC component including a FEC branch and an image compression branch. The end-to-end neural network-based video codec may also comprise a BPLC component. The current video unit can be routed to different components/branches depending on the nature of the current video unit.

At step 4204, a conversion between the current video unit and a bitstream of the video is performed via the end-to-end neural network-based video codec. In an example, the conversion includes encoding the current video unit into the bitstream. In an example, the conversion includes decoding the current video unit from the bitstream. For example, the BPLC component may perform the conversion on the current video unit when the current video unit is not a key frame. Further, the STAC component may perform the conversion on the current video unit when the current video unit is a key frame.

For example, when the current video unit is a key frame, the current video unit can be assigned for conversion by one of the FEC branch and the image compression branch based on motion information of the current video unit, entropy of the current video unit, or combinations thereof. For example, the FEC branch can employ a plurality of coded frames as reference frames to predict the current video unit. In an example, an indication of motion information between the reference frames and the current video unit is included in the bitstream. In another example, motion information between the reference frames and the current video unit may not be included in the bitstream. For example, when the current video unit is not a key frame, the BPLC component can interpolates the current video unit based on at least one preceding reference frame and at least one succeeding reference frame.

In some examples, the current video unit is predicted based on a preceding reconstructed key frame, a succeeding reconstructed key frame, motion information, multiple reference frames, or combinations thereof. In the present disclosure, a preceding frame is a frame that is positioned before the current frame in a video sequence and a succeeding frame is a frame that is positioned after the current frame in the video sequence, respectively.

In some examples, the end-to-end neural network-based video codec selects one of a plurality of inter-predictive compression networks for application to the current video unit. An inter-predictive compression network compresses video by determining motion between frames. For example, the end-to-end neural network-based video codec may include one or more BPLC components, one or more FEC branches, and one or more image compression branches. The end-to-end neural network-based video codec can forward the current video unit to a most optimal component/branch. In an example, this may occur by coding the current video unit by each relevant component/branch and selecting the component/branch that results in the best combination of compression and distortion. In another example, the end-to-end neural network-based video codec may employ one or more learned or predefined parameters to classify the current video unit to be compressed by a corresponding component/branch. In an example, the selection of the one of the plurality of inter-predictive compression networks is included in the bitstream. This indicates to the decoder which inter-predictive compression network should be applied to correctly decode the current video unit.

In an example, the plurality of inter-predictive compression networks includes a flow-based network that codes the current video unit by deriving an optical flow. An optical flow is a pattern of apparent motion of objects, surfaces, and edges in a visual scene caused by the relative motion between an observer and the scene. An optical flow can be estimated by computing an approximation of a motion field based on time-varying image intensity.

In an example, the plurality of inter-predictive compression networks includes a kernel-based network that codes the current video unit by deriving a predicted frame by convolving a learned kernel with one or more reference frames. A learned kernel is one of a set of kernel functions that have been adjusted by applying test data to the set of kernel functions according to a machine learning algorithm. A mathematical convolution operation can be performed to convolve the learned kernel with one or more reference frames to generate a prediction for the current video unit.

In an example, the end-to-end neural network-based video codec may code the current video unit with a combination of block predictions and frame predictions. A block prediction uses samples in a reference block to predict samples in a current block. A frame prediction uses samples in a reference frame to predict samples in a current frame.

In an example. the end-to-end neural network-based video codec selects one of a plurality of motion compression networks for application to the current video unit. Motion compression is a mechanism that employs machine learning to predict object movement across multiple frames based on spatial-temporal patterns and encode an object shape and direction of travel for the object.

In an example, the end-to-end neural network-based video codec selects one of a plurality of intra-predictive compression networks for application to the current video unit. An intra-predictive compression network compresses a frame based on similarity between regions of in the same frame.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200. Further, a non-transitory computer-readable recording medium may store a bitstream of a video which is generated by the method 4200 as performed by a video processing apparatus. In addition, the method 4200 can be performed by an apparatus for processing video data comprising a processor and a non-transitory memory with instructions thereon. The instructions, upon execution by the processor, cause the processor to perform method 4200.

Figure 10:
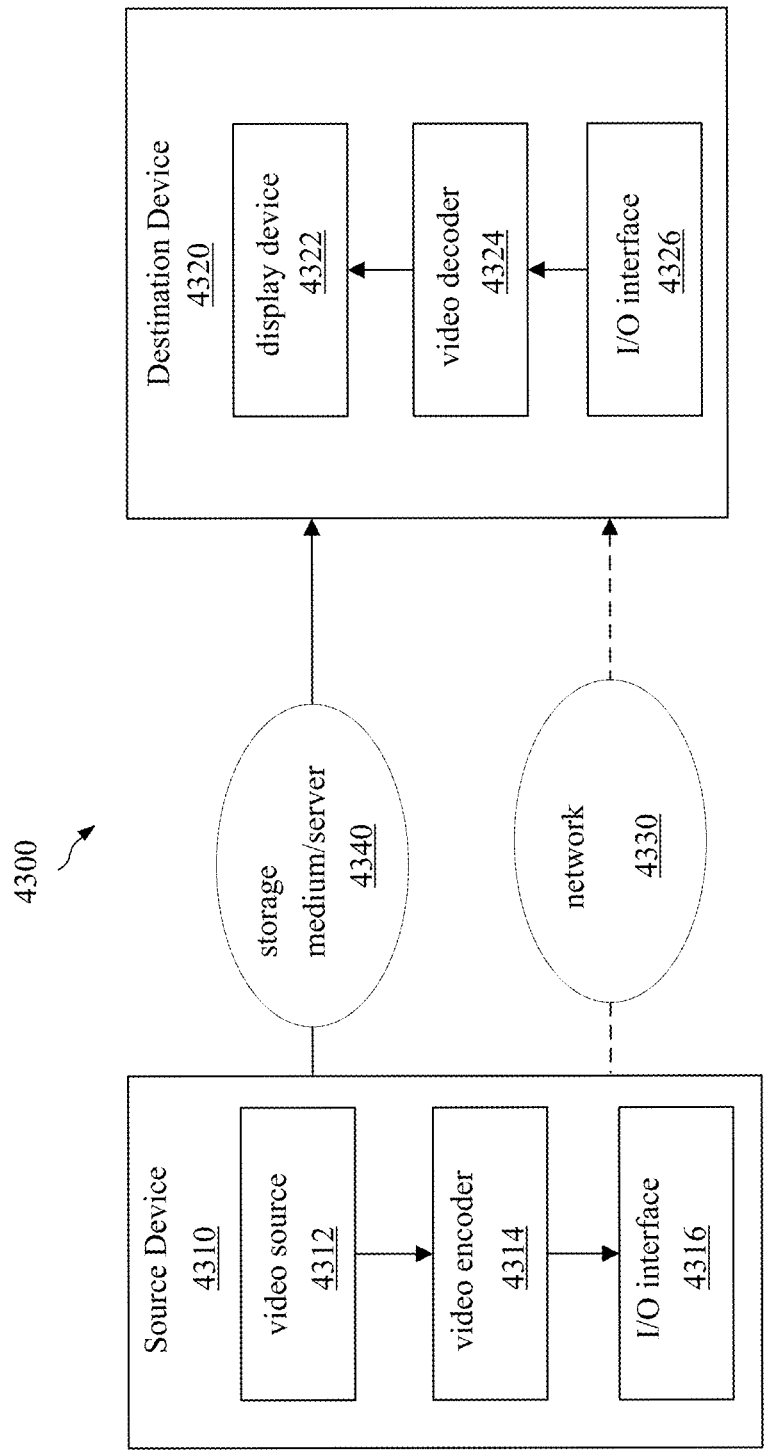
FIG. 10 is a block diagram that illustrates an example video coding system.

FIG. 10 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVM) standard and other current and/or further standards.

Figure 11:
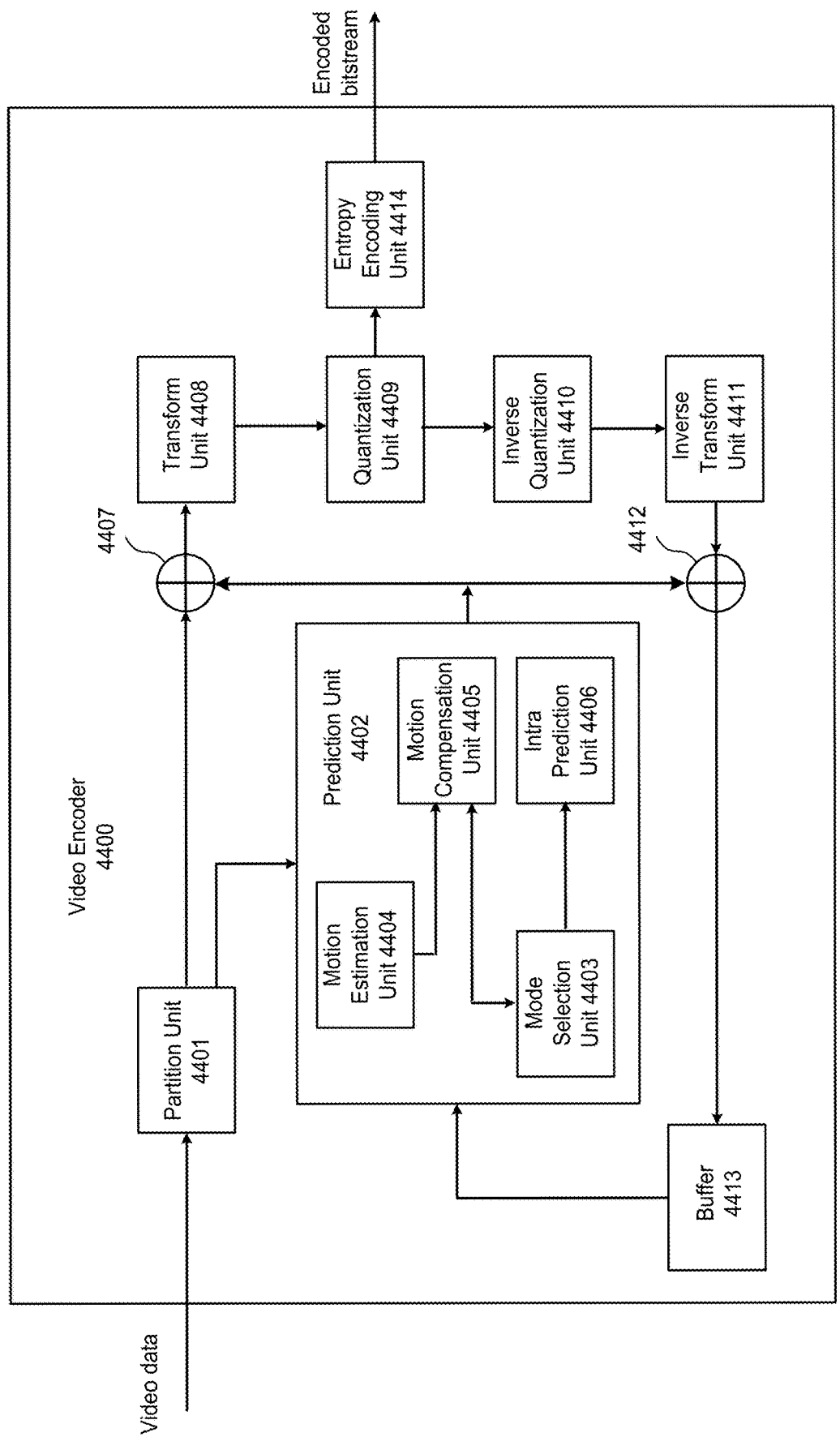
FIG. 11 is a block diagram that illustrates an example encoder.

FIG. 11 is a block diagram illustrating an example of video encoder 4400, which may be video encoder 4314 in the system 4300 illustrated in FIG. 10. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 12:
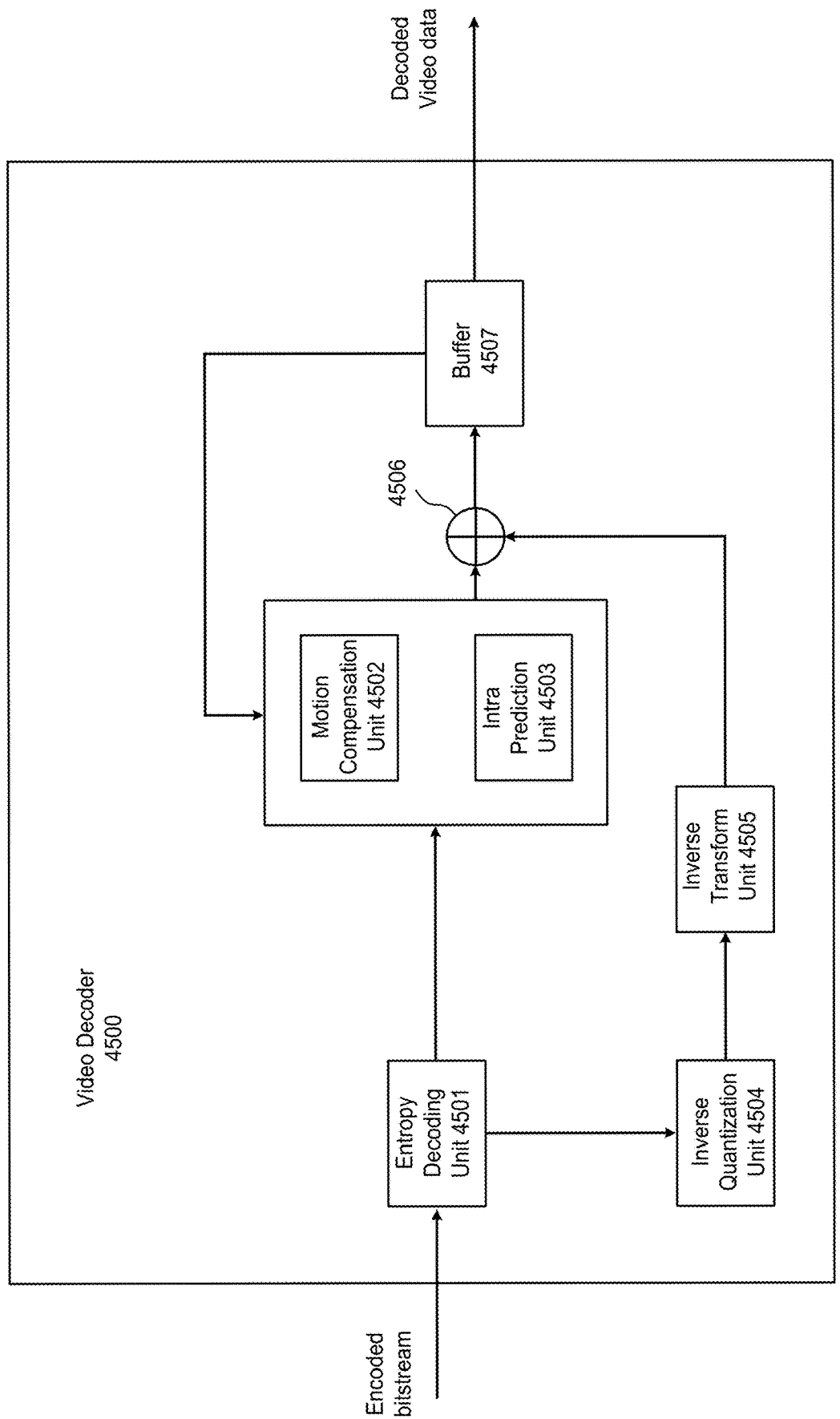
FIG. 12 is a block diagram that illustrates an example decoder.

FIG. 12 is a block diagram illustrating an example of video decoder 4500 which may be video decoder 4324 in the system 4300 illustrated in FIG. 10. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 13:
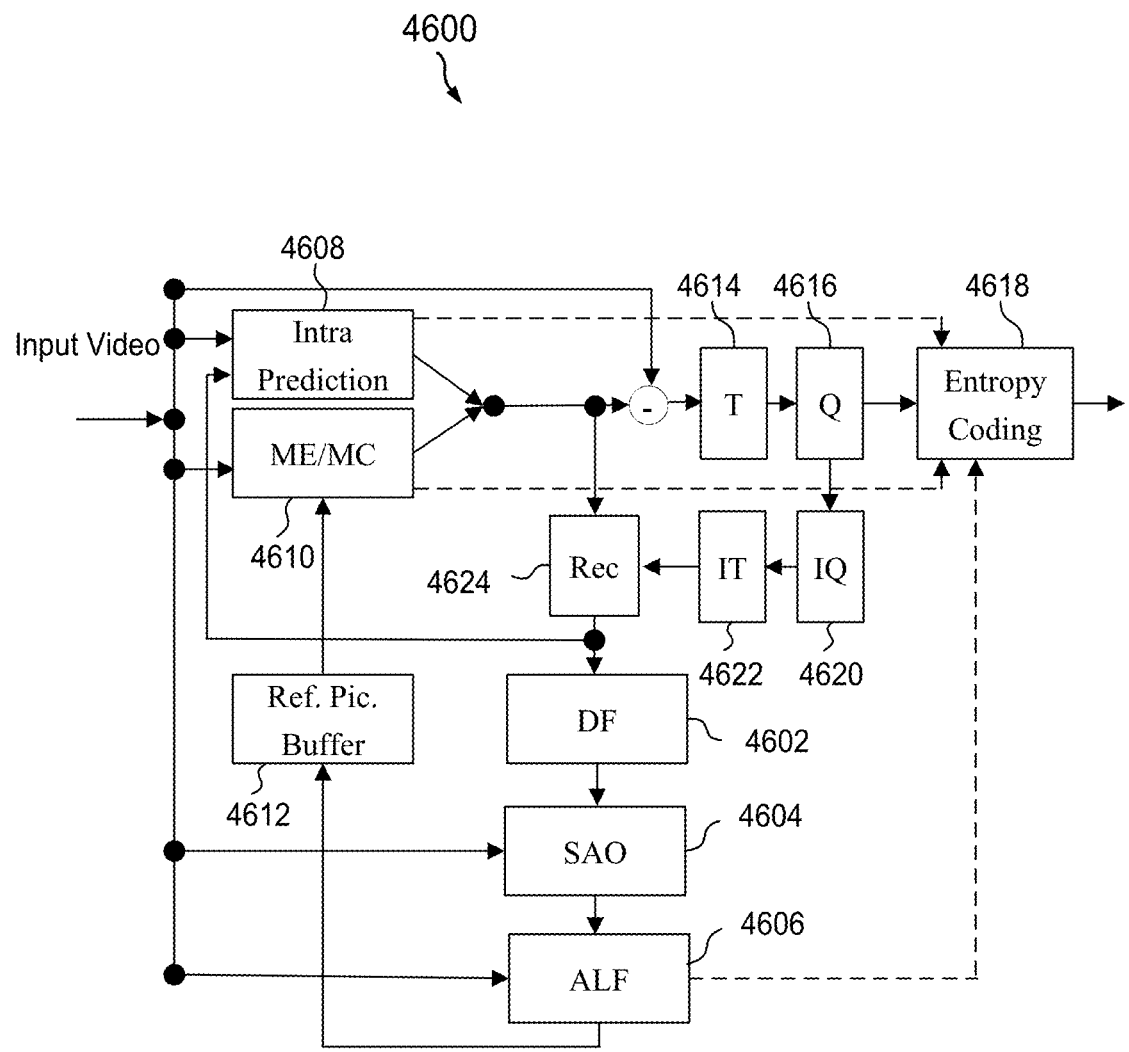
FIG. 13 is a schematic diagram of an example encoder.

FIG. 13 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of techniques discussed herein.

1. A method of media data processing (e.g., method 4200 depicted in FIG. 9), comprising: determining, for a conversion between a video comprising video units and a bitstream of the video using neural network-based processing, which coding process between an extrapolation process and an image compressor scheme to use for a current video unit based on a rule; and performing the conversion according to the determining.
2. The method of solution 1, wherein the extrapolation process is based on a frame extrapolative compression, FEC.
3. The method of solution 2, wherein the FEC uses N previously coded video units for predicting the current video unit, where N is a positive integer.
4. The method of solution 3, wherein N and/or the coding process are indicated in the bitstream.
5. A method of video processing, comprising: performing, using a video processing apparatus, a conversion between a video and a bitstream of the video, wherein the video processing system includes a spatial-temporal adaptive compression, STAC, module that is configured to processing key frames of the video and a bilateral predictive learned compression module, BPLC, that is configured for processing non-key frames of the video, wherein the STAC module comprises a plurality of techniques for removing spatial or temporal redundancies in the video.
6. The method of solution 5, further including operating the STAC module to implement an image compression or decompression technique and an extrapolation-based compression or decompression technique.
7. The method of any of solutions 5-6, further including: operating the BPLC module to use N reference frames where N is an integer greater than 1.
8. The method of any of solutions 5-7, further including: operating the BPLC module to perform video unit interpolation in a hierarchical manner.
9. A method of video processing, comprising: performing a conversion between a video and a bitstream of the video using a neural network-based processing; wherein the video comprises one or more key video units and one or more non-key video units, wherein the key video units are selectively coded using a spatial-temporal adaptive compression tool according to a rule.
10. The method of solution 9, wherein the rule specifies to use between the spatial-temporal adaptive compression tool and an image processing tool according to a rate distortion minimization criterion.
11. The method of solution 9, wherein the key video units are predictively coded using previously processed key frames.
12. The method of solution 9, wherein the spatial-temporal adaptive compression tool comprises an inter-predictive coding tool that includes a flow-based coding tool.
13. The method of solution 9, wherein the spatial-temporal adaptive compression tool comprises an inter-predictive coding tool that includes forward prediction tool or a backward prediction tool.
14. The method of solution 9, wherein the rule enables use of an intra-predictive coding tool.
15. The method of solution 9, wherein the rule enables use of a motion compression coding tool.
16. The method of solution 9, wherein the rule enables use of a multiple-pass coding tool.
17. The method of any of solutions 1-16, wherein the neural network based processing includes, for the conversion of a current video unit, using an extrapolated video unit together with a residual video unit.
18. The method of solution 17, wherein the extrapolated video unit is concatenated with the residual video unit and used as an input in the neural network processing both at an encoder side and a decoder side.
19. The method of any of solutions 1-18, wherein the video unit comprises a video picture or a video slice or a video tile or a video subpicture.
20. The method of any of solutions 1-18, wherein the video unit comprises a coding tree unit, CTU, row, a CTU, a coding tree block CTB, a coding unit CU, a prediction unit PU, a transform unit TU, a coding block CB, a transform block TB, a virtual pipeline data unit VPDU, or a region of samples.
21. The method of any of solutions 1-20, wherein the conversion includes generating the bitstream from the video.

22. The method of any of solutions 1-20, wherein the conversion includes generating the video from the bitstream.
23. A video decoding apparatus comprising a processor configured to implement a method recited in one or more of solutions 1 to 21.
24. A video encoding apparatus comprising a processor configured to implement a method recited in one or more of solutions 1 to 21.
25. A computer program product having computer code stored thereon, the code, when executed by a processor, causes the processor to implement a method recited in any of solutions 1 to 22.
26. A method of video processing comprising generating a bitstream according to a method recited in any one or more of solutions 1-21 and storing the bitstream on a computer readable medium.
27. A method, apparatus or system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data comprising:
    determining to apply an end-to-end neural network-based video codec to a current video unit of a video, wherein the end-to-end neural network-based video codec comprises a spatial-temporal adaptive compression (STAC) component including a frame extrapolative compression (FEC) branch and an image compression branch; and
    performing a conversion between the current video unit and a bitstream of the video via the end-to-end neural network-based video codec;
    wherein the FEC branch employs a plurality of coded frames as reference frames to predict the current video unit, and wherein an indication of motion information between the reference frames and the current video unit is included in the bitstream.

2. The method of claim 1, wherein the current video unit is assigned for conversion by one of the FEC branch and the image compression branch based on motion information of the current video unit, entropy of the current video unit, or combinations thereof.

3. The method of claim 1, wherein the motion information between the reference frames and the current video unit is not included in the bitstream.

4. The method of claim 1, wherein the end-to-end neural network-based video codec further comprises a bilateral predictive learned compression (BPLC) component, wherein the STAC component performs the conversion on the current video unit when the current video unit is a key frame, and wherein the BPLC component performs the conversion on the current video unit when the current video unit is not a key frame.

5. The method of claim 4, wherein the BPLC component interpolates the current video unit based on at least one preceding reference frame and at least one succeeding reference frame.

6. The method of claim 1, wherein the current video unit is predicted based on a preceding reconstructed key frame, a succeeding reconstructed key frame, motion information, multiple reference frames, or combinations thereof.

7. The method of claim 1, wherein the end-to-end neural network-based video codec selects one of a plurality of inter-predictive compression networks for application to the current video unit.

8. The method of claim 7, wherein the plurality of inter-predictive compression networks includes a flow-based network that codes the current video unit by deriving an optical flow.

9. The method of claim 8, wherein the plurality of inter-predictive compression networks includes a kernel-based network that codes the current video unit by deriving a predicted frame by convolving a learned kernel with one or more reference frames.

10. The method of claim 7, wherein the selection of the one of the plurality of inter-predictive compression networks is included in the bitstream.

11. The method of claim 1, wherein the end-to-end neural network-based video codec selects one of a plurality of intra-predictive compression networks for application to the current video unit.

12. The method of claim 1, wherein the end-to-end neural network-based video codec codes the current video unit with a combination of block predictions and frame predictions.

13. The method of claim 1, wherein the end-to-end neural network-based video codec selects one of a plurality of motion compression networks for application to the current video unit.

14. The method of claim 1, wherein the conversion includes encoding the current video unit into the bitstream.

15. The method of claim 1, wherein the conversion includes decoding the current video unit from the bitstream.

16. An apparatus for processing video data comprising:
    a processor; and
    a non-transitory memory with instructions thereon, wherein the instructions upon execution by the processor, cause the processor to:
    determine to apply an end-to-end neural network-based video codec to a current video unit of a video, wherein the end-to-end neural network-based video codec comprises a spatial-temporal adaptive compression (STAC)

component including a frame extrapolative compression (FEC) branch and an image compression branch; and perform a conversion between the current video unit and a bitstream of the video via the end-to-end neural network-based video codec;

wherein the FEC branch employs a plurality of coded frames as reference frames to predict the current video unit, and wherein an indication of motion information between the reference frames and the current video unit is included in the bitstream.

17. The apparatus of claim 16, wherein the current video unit is assigned for conversion by one of the FEC branch and the image compression branch based on motion information of the current video unit, entropy of the current video unit, or combinations thereof.

18. The apparatus of claim 16, wherein the end-to-end neural network-based video codec further comprises a bilateral predictive learned compression (BPLC) component, wherein the STAC component performs the conversion on the current video unit when the current video unit is a key frame, and wherein the BPLC component performs the conversion on the current video unit when the current video unit is not a key frame.

19. A non-transitory computer-readable recording medium storing a bitstream of a video which is generated by a method performed by a video processing apparatus, wherein the method comprises:

determining to apply an end-to-end neural network-based video codec to a current video unit of the video, wherein the end-to-end neural network-based video codec comprises a spatial-temporal adaptive compression (STAC) component including a frame extrapolative compression (FEC) branch and an image compression branch; and generating the bitstream via the end-to-end neural network-based video codec;

wherein the FEC branch employs a plurality of coded frames as reference frames to predict the current video unit, and wherein an indication of motion information between the reference frames and the current video unit is included in the bitstream.

\* \* \* \* \*